INVENTOR
Thomas P. Walsh
by Fred W McArdle
atty

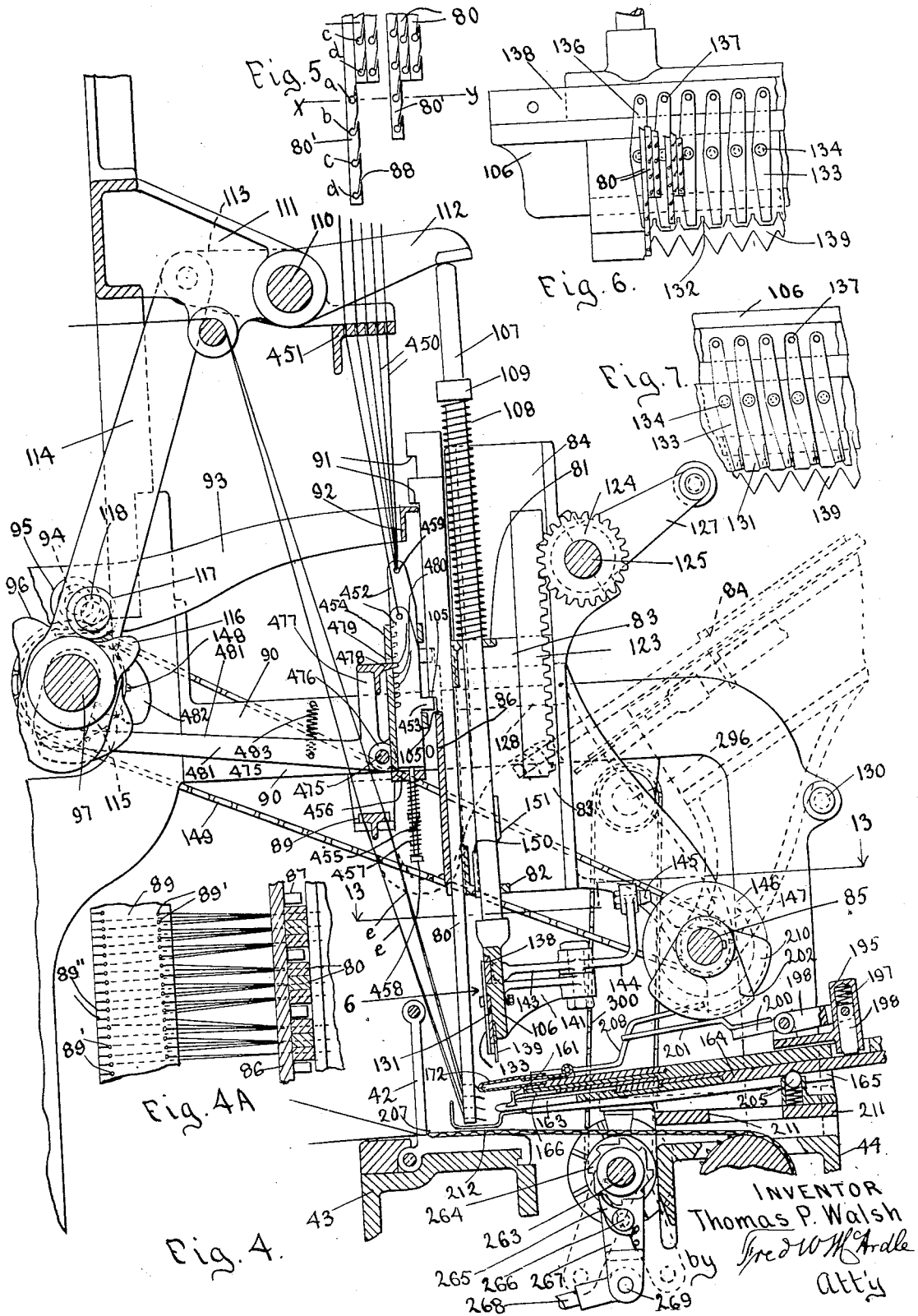

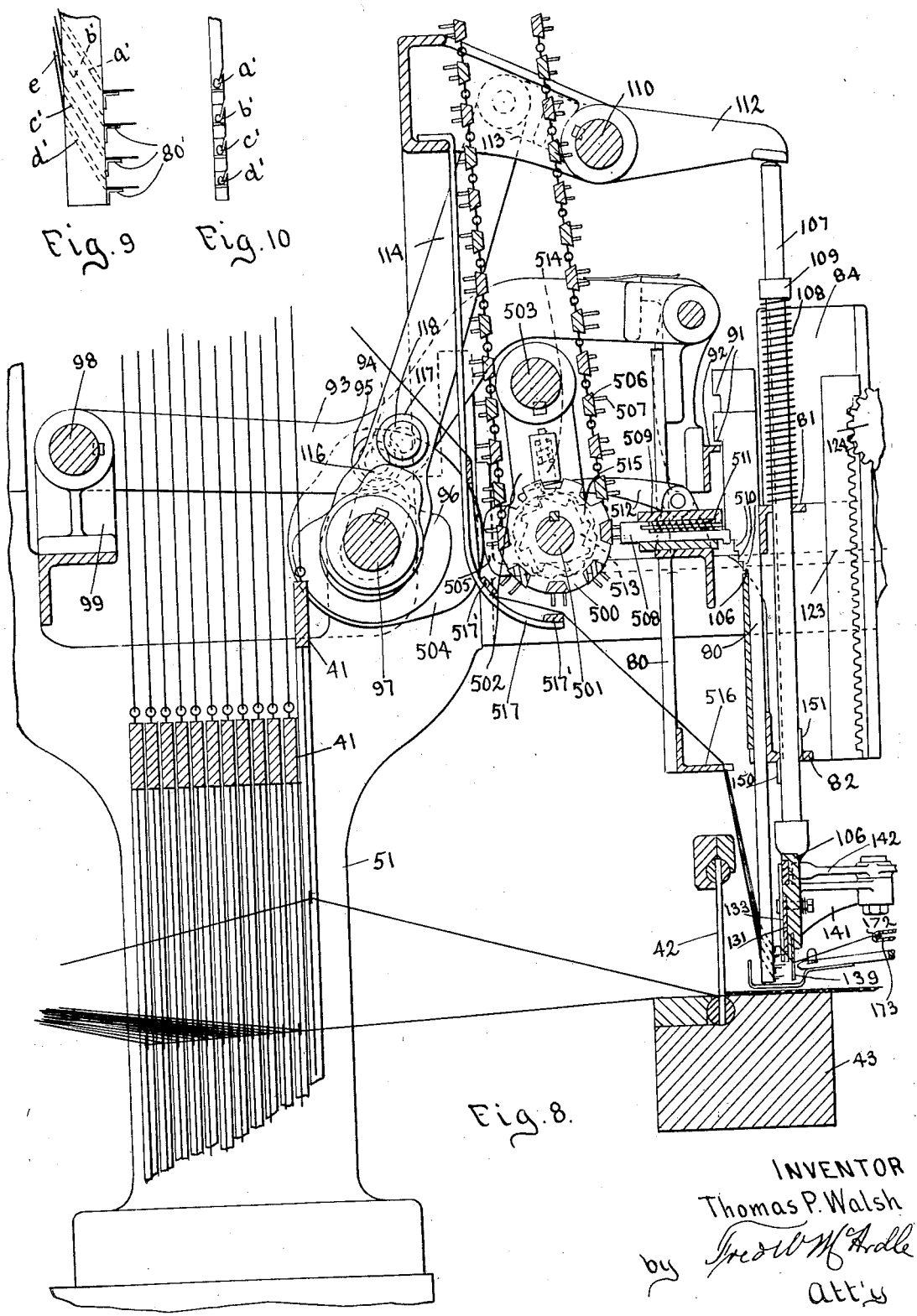

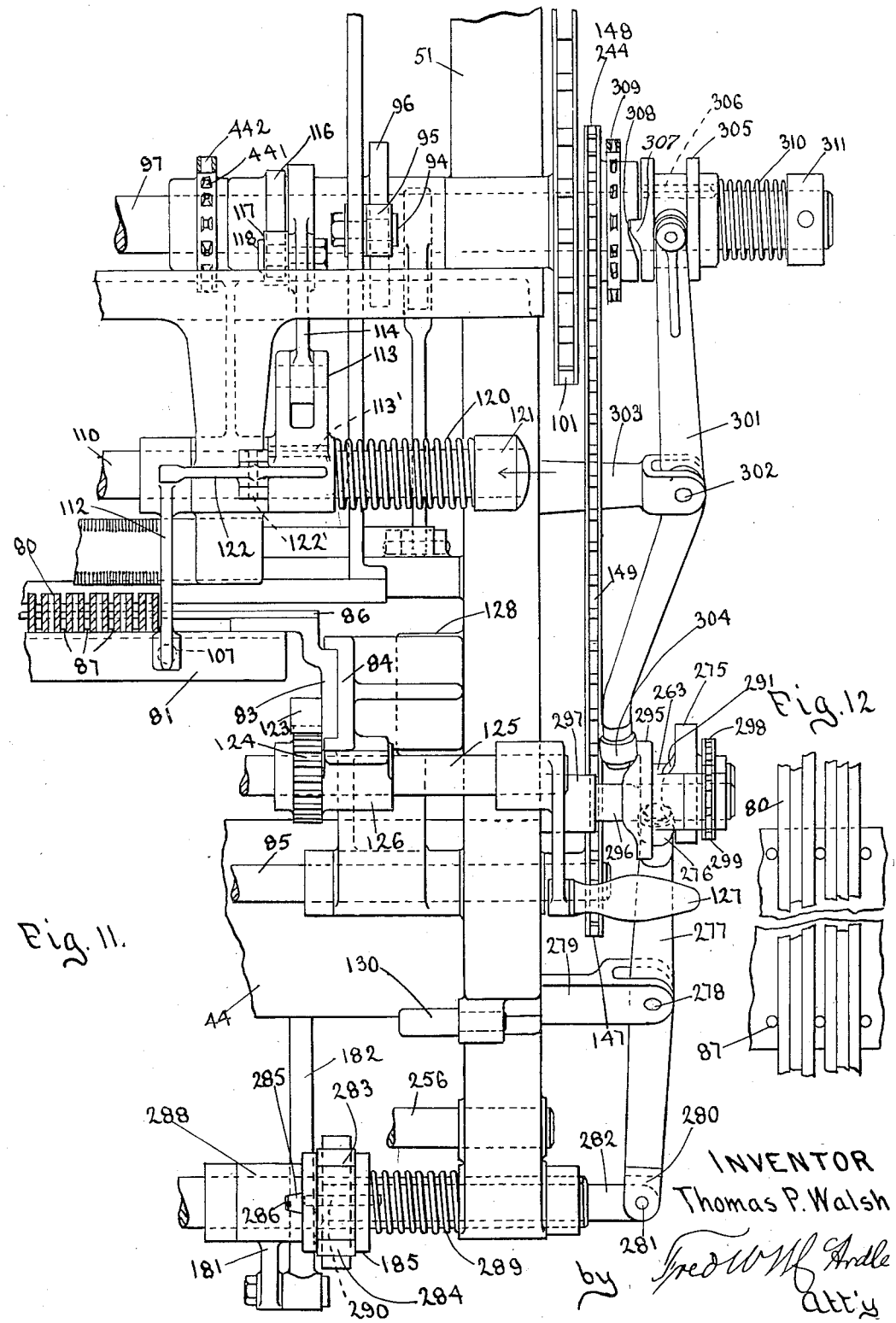

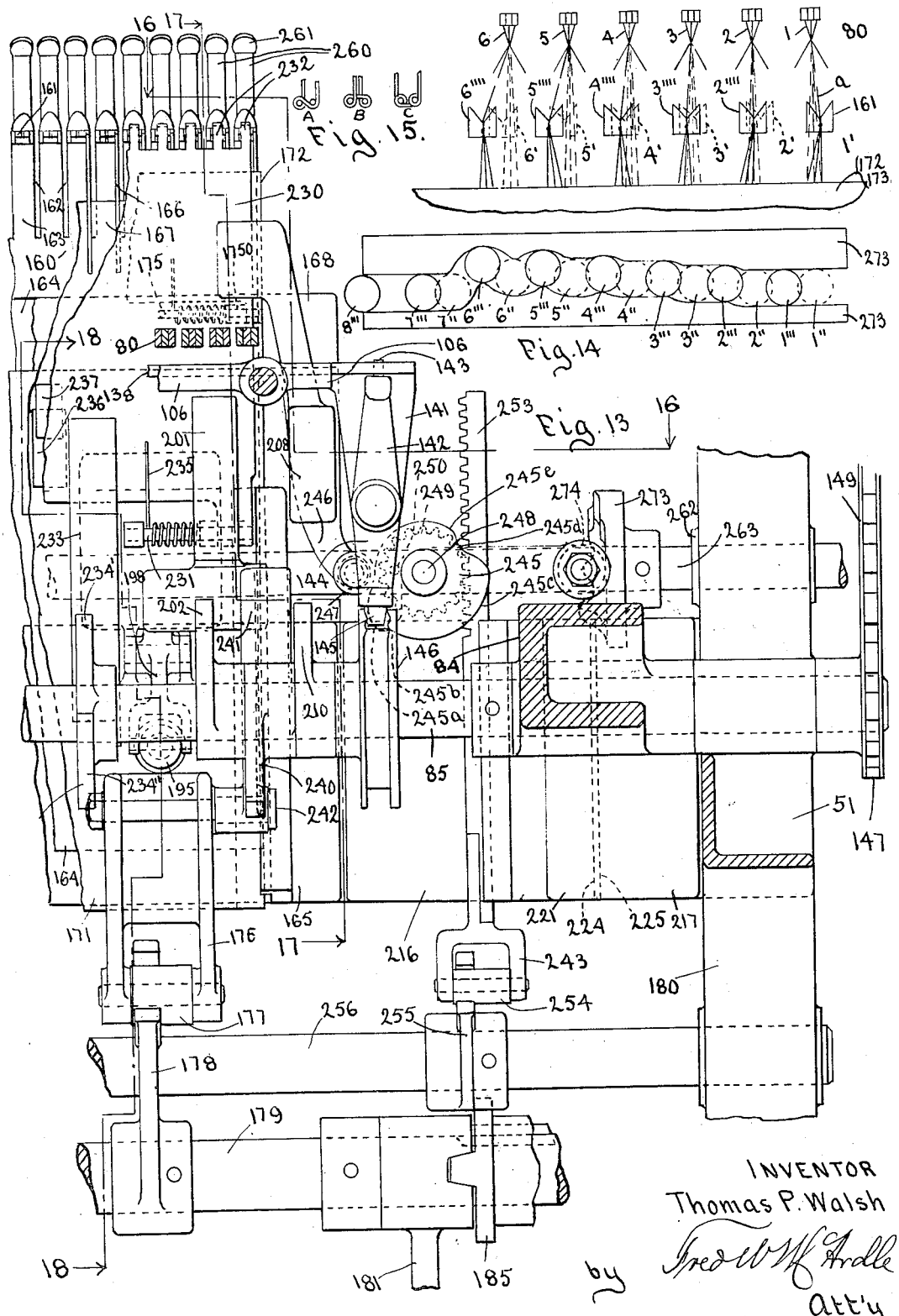

July 4, 1933.  T. P. WALSH  1,916,290
LOOM FOR WEAVING ORIENTAL KNOTTED FABRICS
Filed May 18, 1931   16 Sheets-Sheet 8
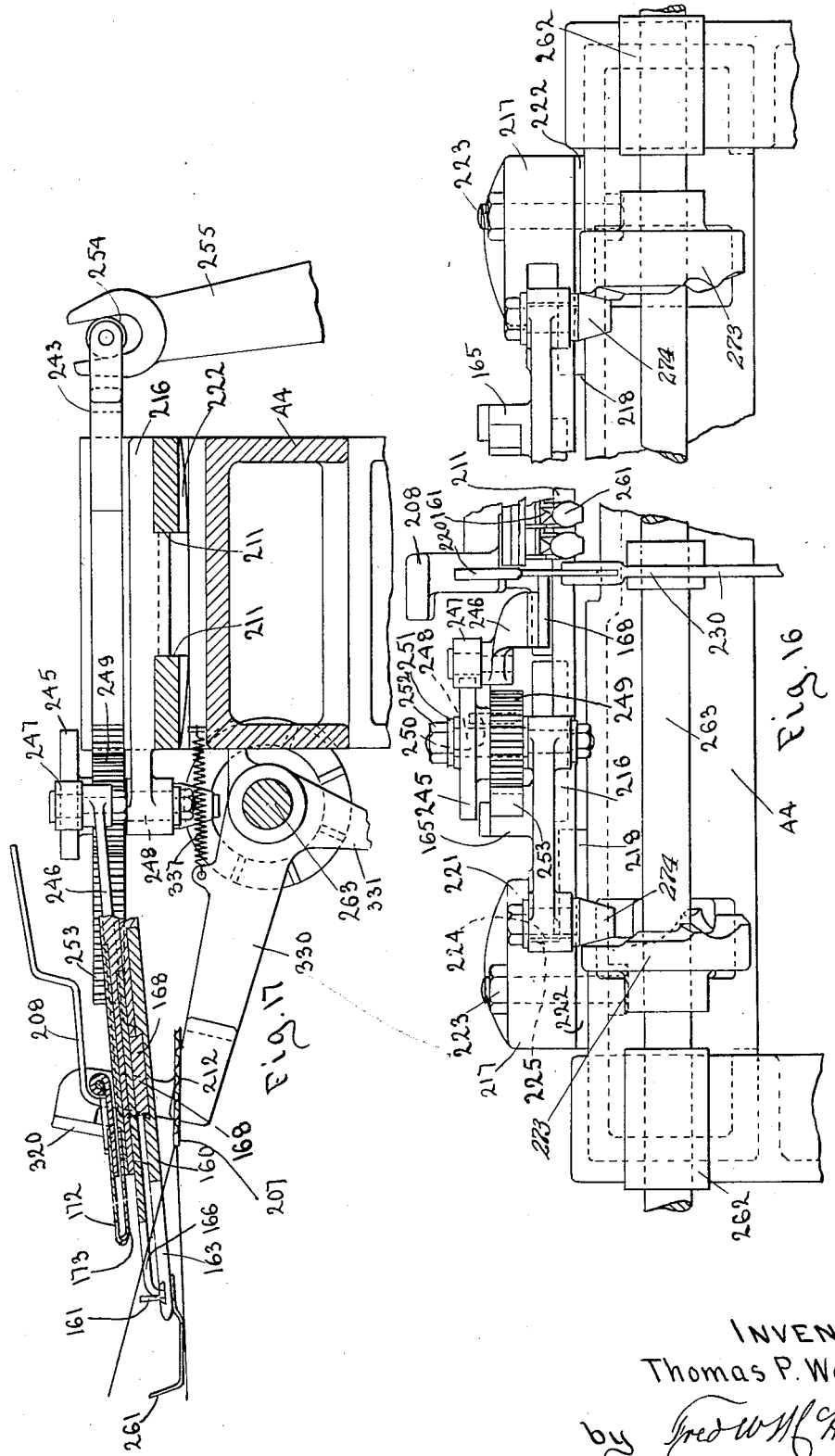
INVENTOR
Thomas P. Walsh
by Fred W McArdle
att'y

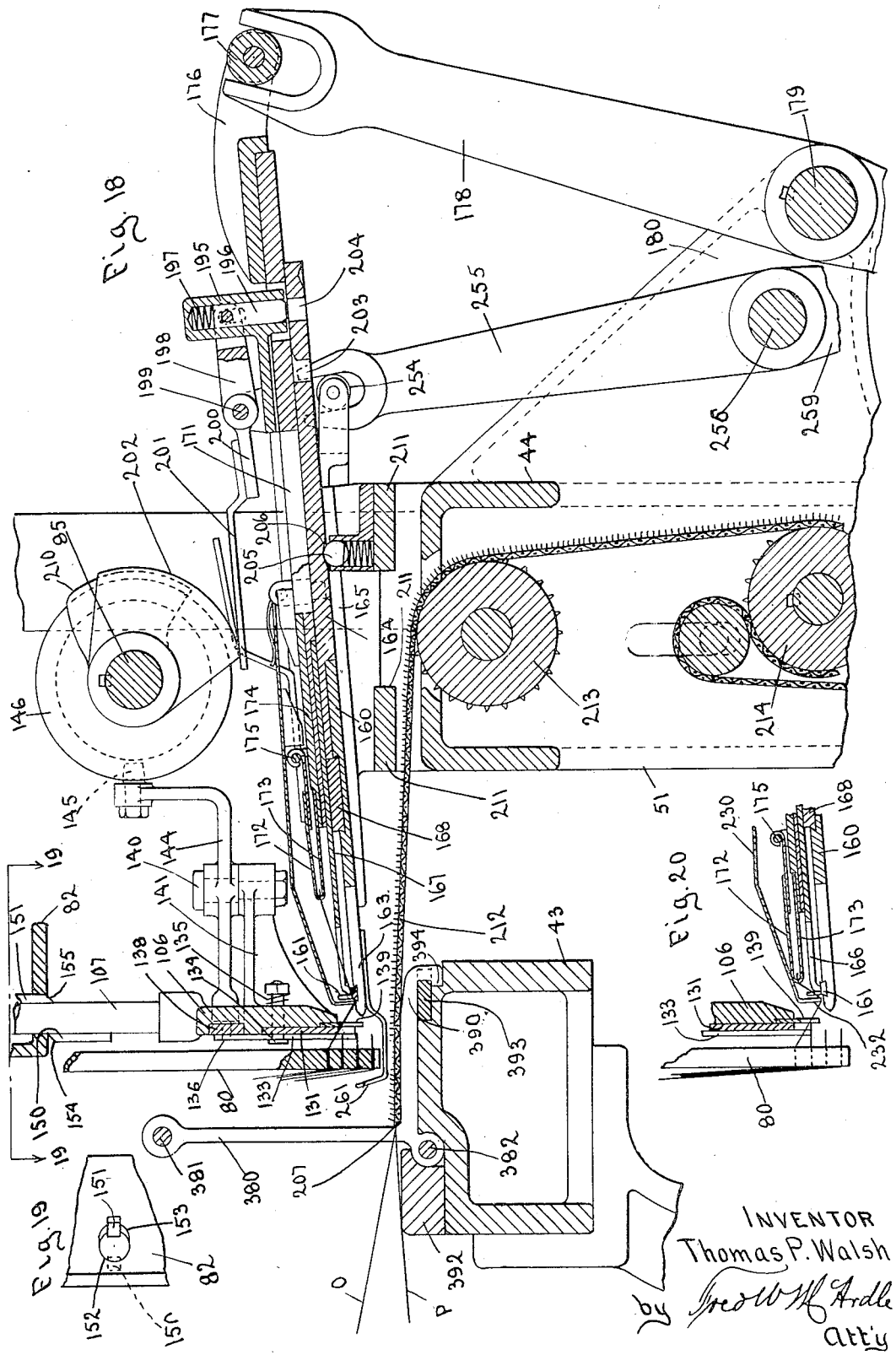

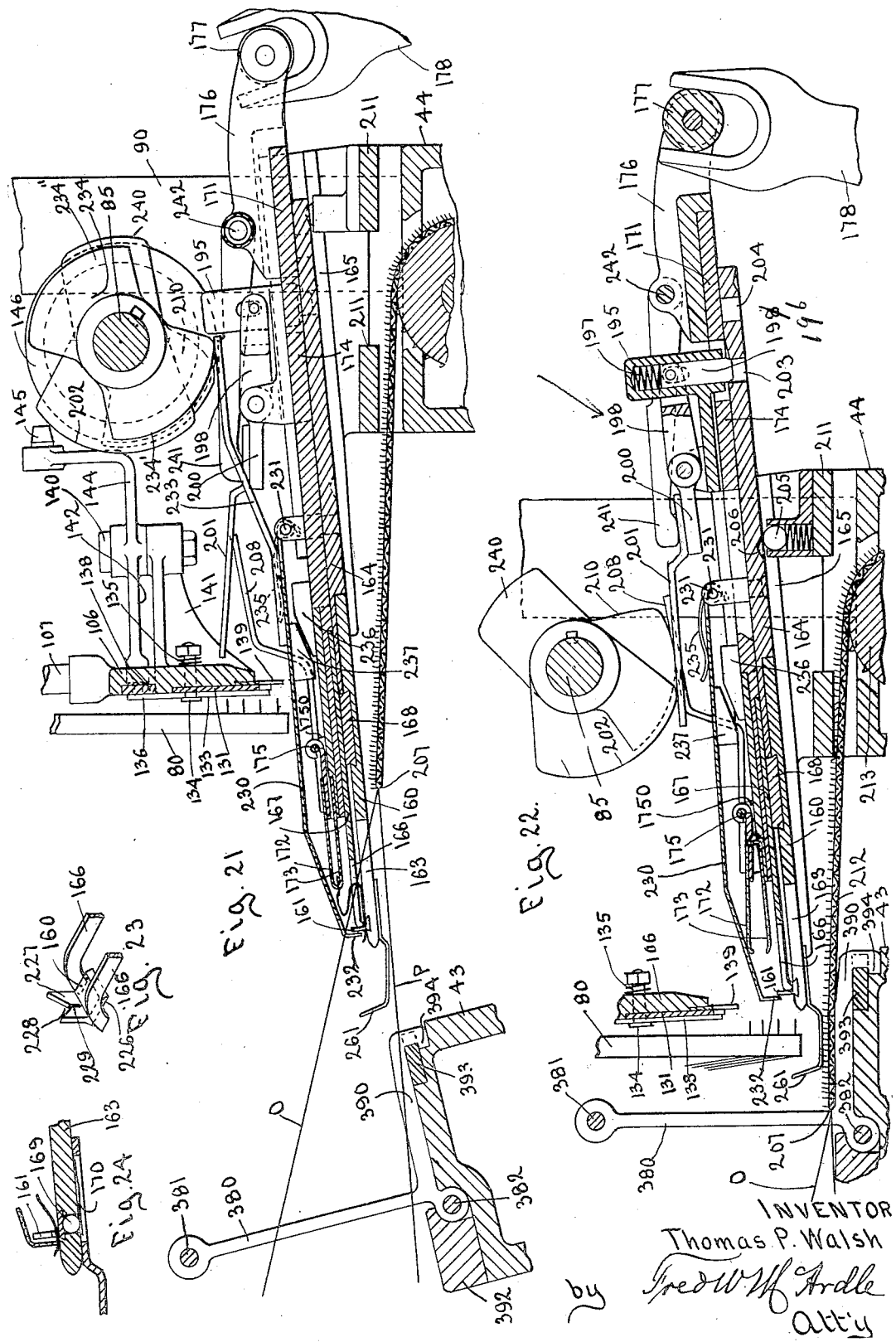

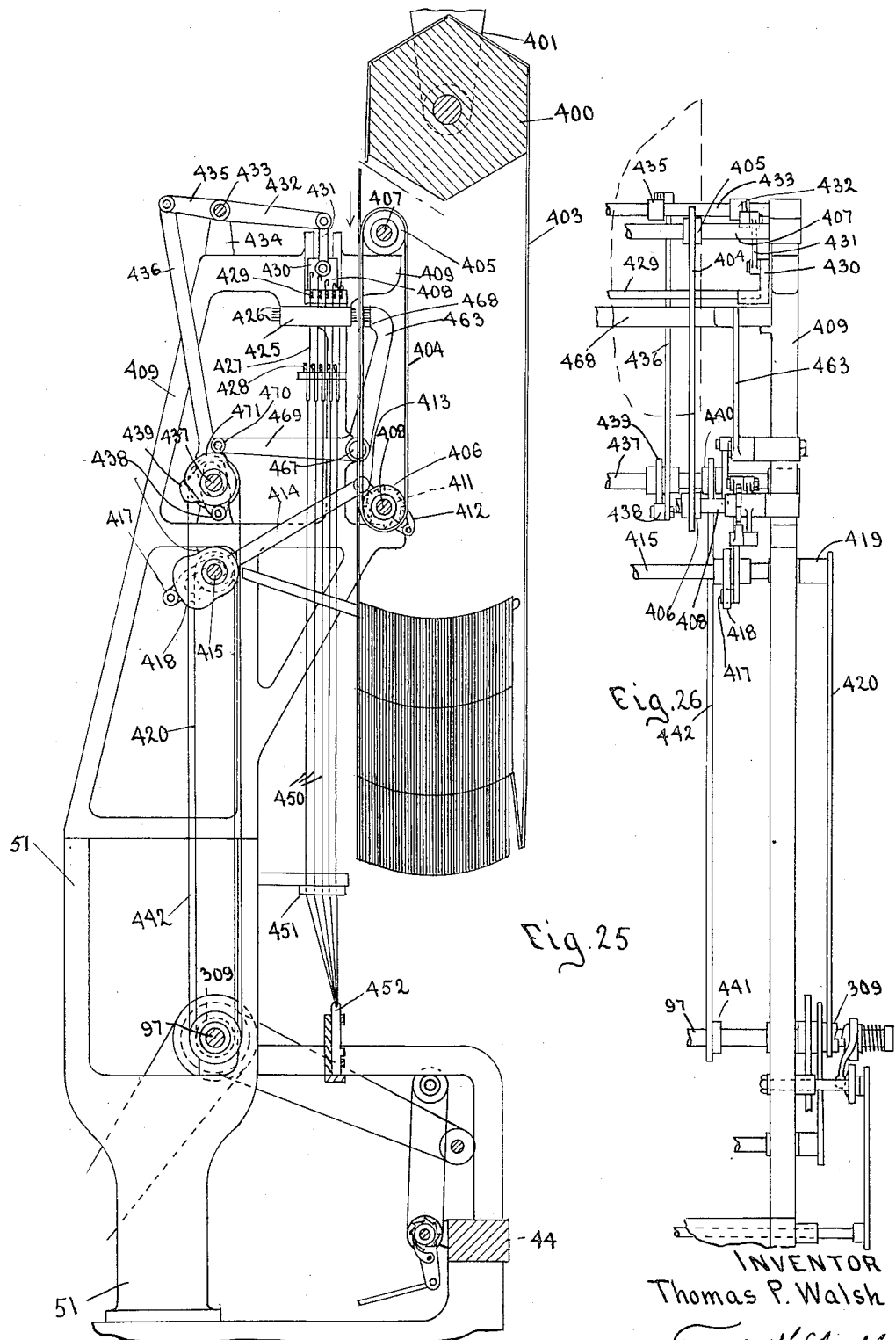

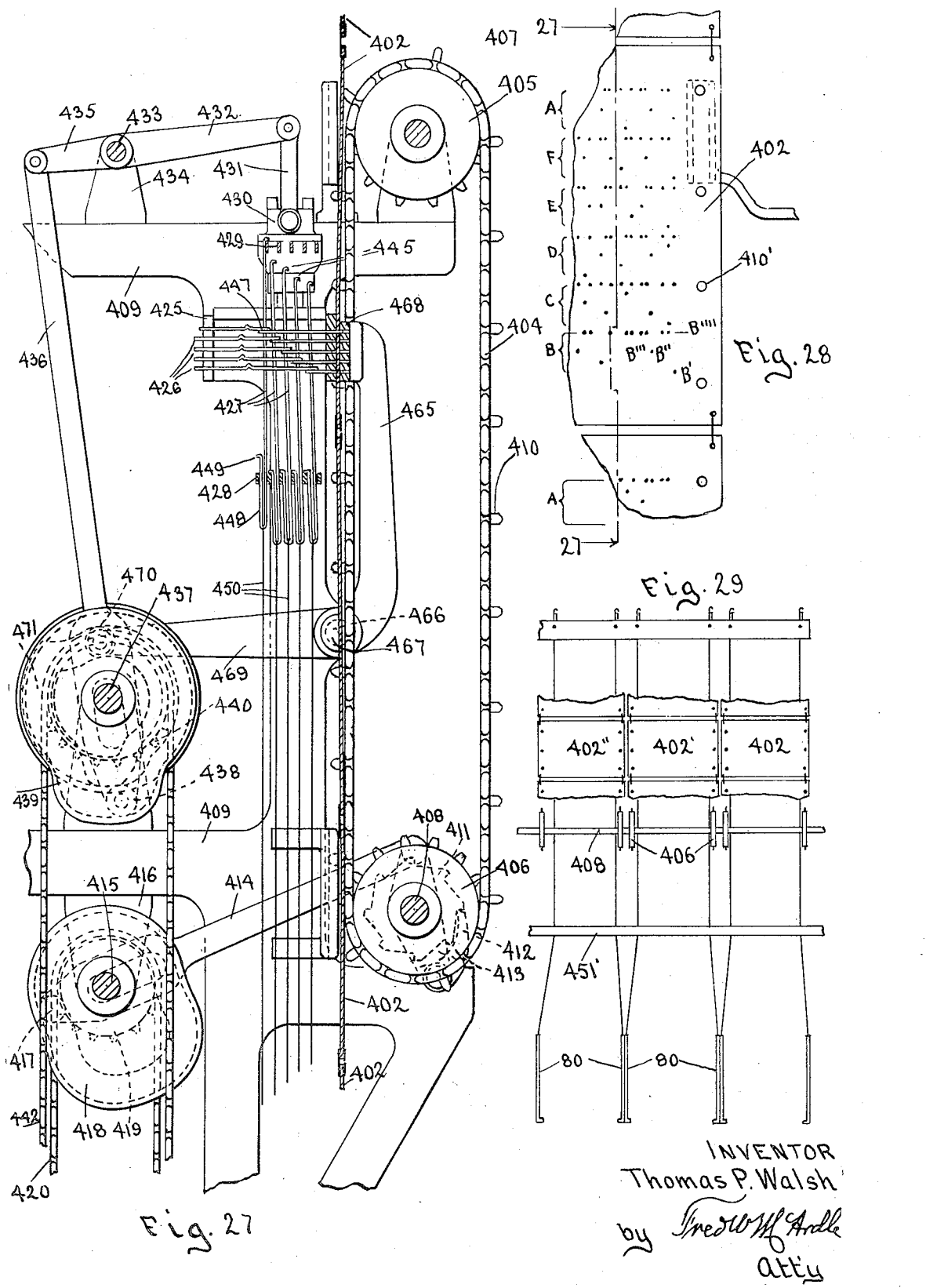

July 4, 1933.  T. P. WALSH  1,916,290
LOOM FOR WEAVING ORIENTAL KNOTTED FABRICS
Filed May 18, 1931  16 Sheets-Sheet 13
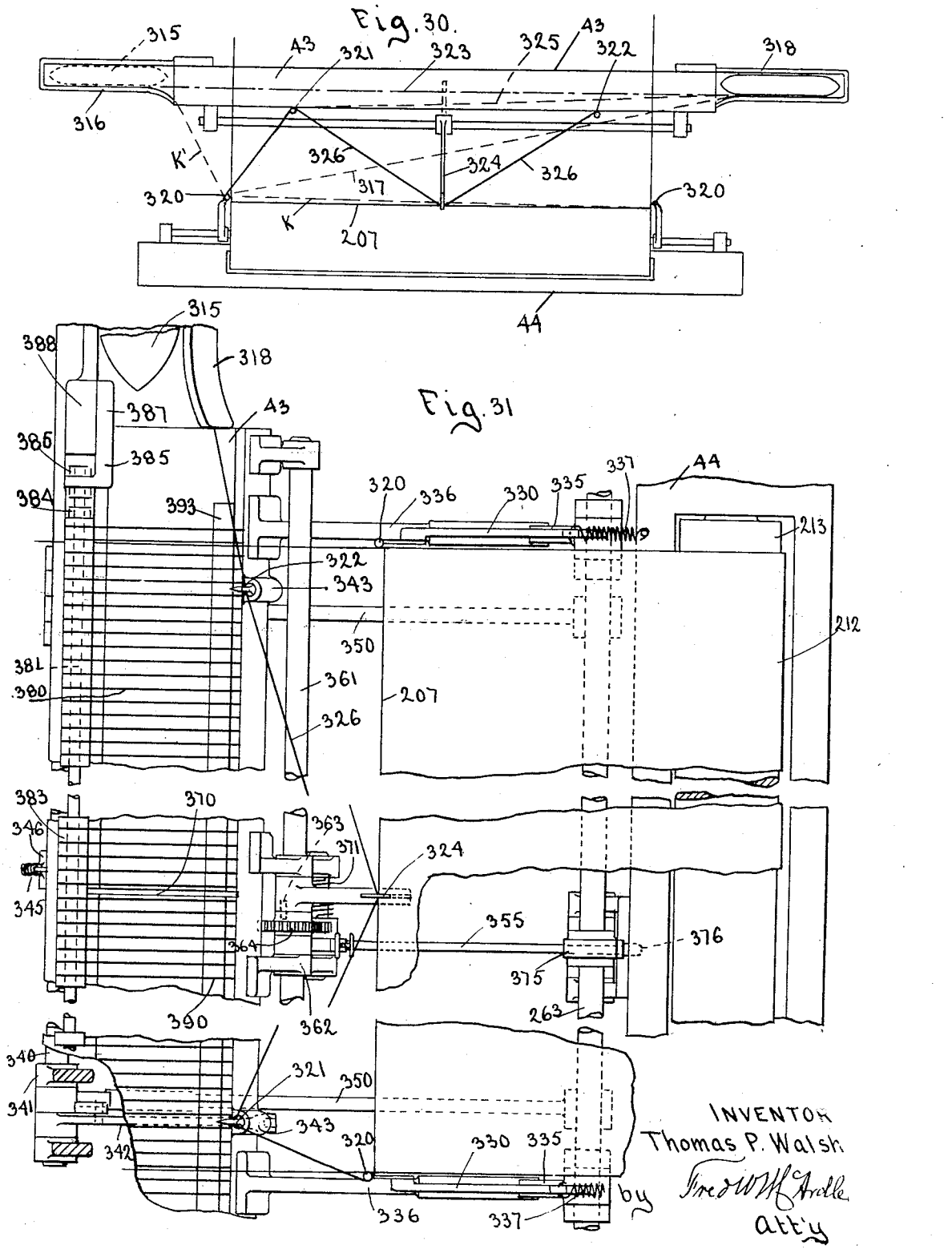

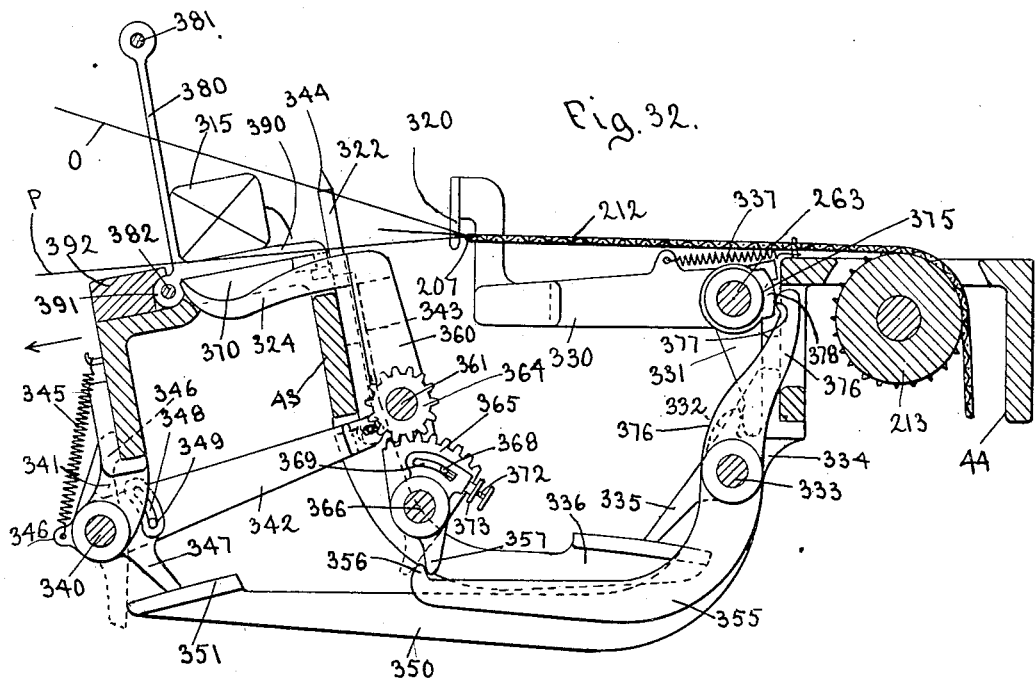
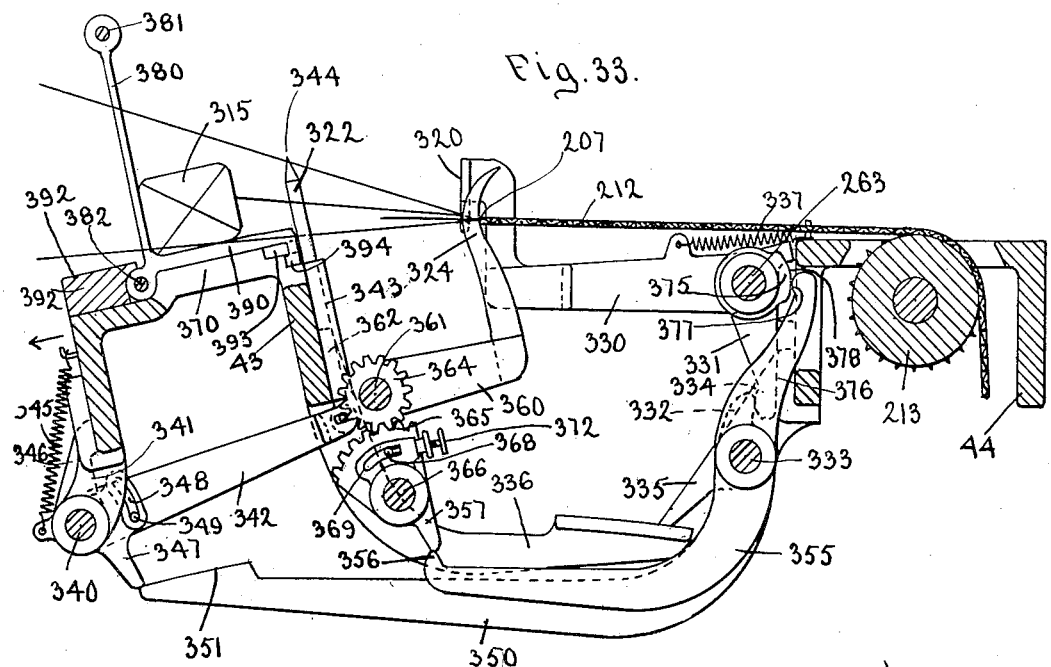

July 4, 1933.  T. P. WALSH  1,916,290
LOOM FOR WEAVING ORIENTAL KNOTTED FABRICS
Filed May 18, 1931    16 Sheets-Sheet 16

Fig. 37 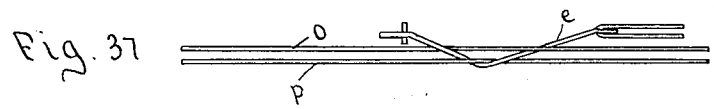    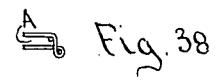 Fig. 38

Fig. 43 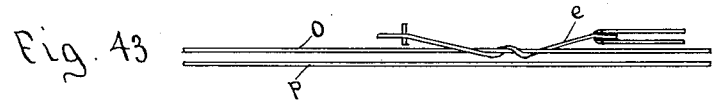    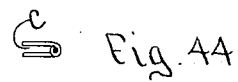 Fig. 44

Fig. 48 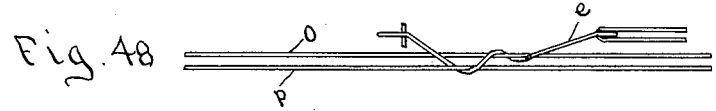    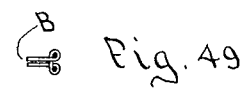 Fig. 49
INVENTOR
Thomas P. Walsh
by Fred W. McArdle
atty Patented July 4, 1933

1,916,290

UNITED STATES PATENT OFFICE

THOMAS P. WALSH, OF BOSTON, MASSACHUSETTS, ASSIGNOR TO THE B. H. R. W. DEVELOPMENT COMPANY, OF NEW YORK, N. Y., A CORPORATION OF NEW YORK

LOOM FOR WEAVING ORIENTAL KNOTTED FABRICS

Application filed May 18, 1931. Serial No. 538,166.

My invention relates to looms for weaving oriental knotted fabrics.

One object of my invention is to provide devices, operated to coordinate with the usual shedding mechanism, common to most cloth weaving looms, to produce oriental knotted fabrics, such as rugs and the like.

A second object is to provide a loom for producing oriental knotted fabrics, having a capacity for a variety of colored yarns which may be selectively supplied to produce a knotted fabric of predetermined pattern.

A further object of my invention is to provide means for the purpose and of the character above stated, which may form an attachment to looms, such as are in common use, coordinating in operation and cooperating with the usual loom mechanism to produce the knotted fabric.

In my present invention, I have devised means which will accomplish the above objects, producing a close woven fabric in which individual color yarns are knotted about contiguous warp threads to produce a knotted pile fabric, the warp and weft threads being concealed, and the woven pattern showing on both faces.

My invention consists in the combination of elements in the form of cooperating devices, coordinated in action with the usual loom mechanism and with one another, to attain the objects above specified.

One of the important features of my invention consists in the knotting device which I employ, in which yarns, selectively presented by suitable pattern mechanism, or by Axminster spools, are respectively engaged by suitable carrier elements, severed to provide sufficient yarn for a knot, transferred to knotting position relative to the warp threads, and the knot completed and drawn taut against the fell and about the respective warps.

Another feature consists in improvements in connection with the selective means.

In this connection I have shown a preferred form of pattern device forming a part of my invention, a modification in which other pattern mechanism is shown, and a fragment in which is diagrammatically shown an Axminster spool as adapted for use with my weaving mechanism, the Axminster spool system being substantially the same as now in common use for weaving Axminster rugs.

Another important feature relates to the novel means I employ for knotting the yarn strands about the warp threads.

Not only is my invention as a whole adapted for use in combination with the type of loom shown and with some other types, for the production of knotted fabrics, but portions of my invention are adaptable for use with looms used for ordinary weaving of cloth, carpets and the like.

The objects and features of my invention above noted, together with other novel features and combinations of elements, will be hereinafter described and illustrated in the accompanying specifications and claims, and the drawings forming a part thereof.

In the embodiment of my invention herein described and illustrated, I have adapted it to conform in its general arrangement, with the mechanism of the usual type of fly shuttle loom, but I do not confine myself thereto, nor to the construction or operation of the several mechanisms described, as modifications and substitutions of equivalent elements or members may be made within the scope of the appended claims.

In the drawings—

Figure 2:
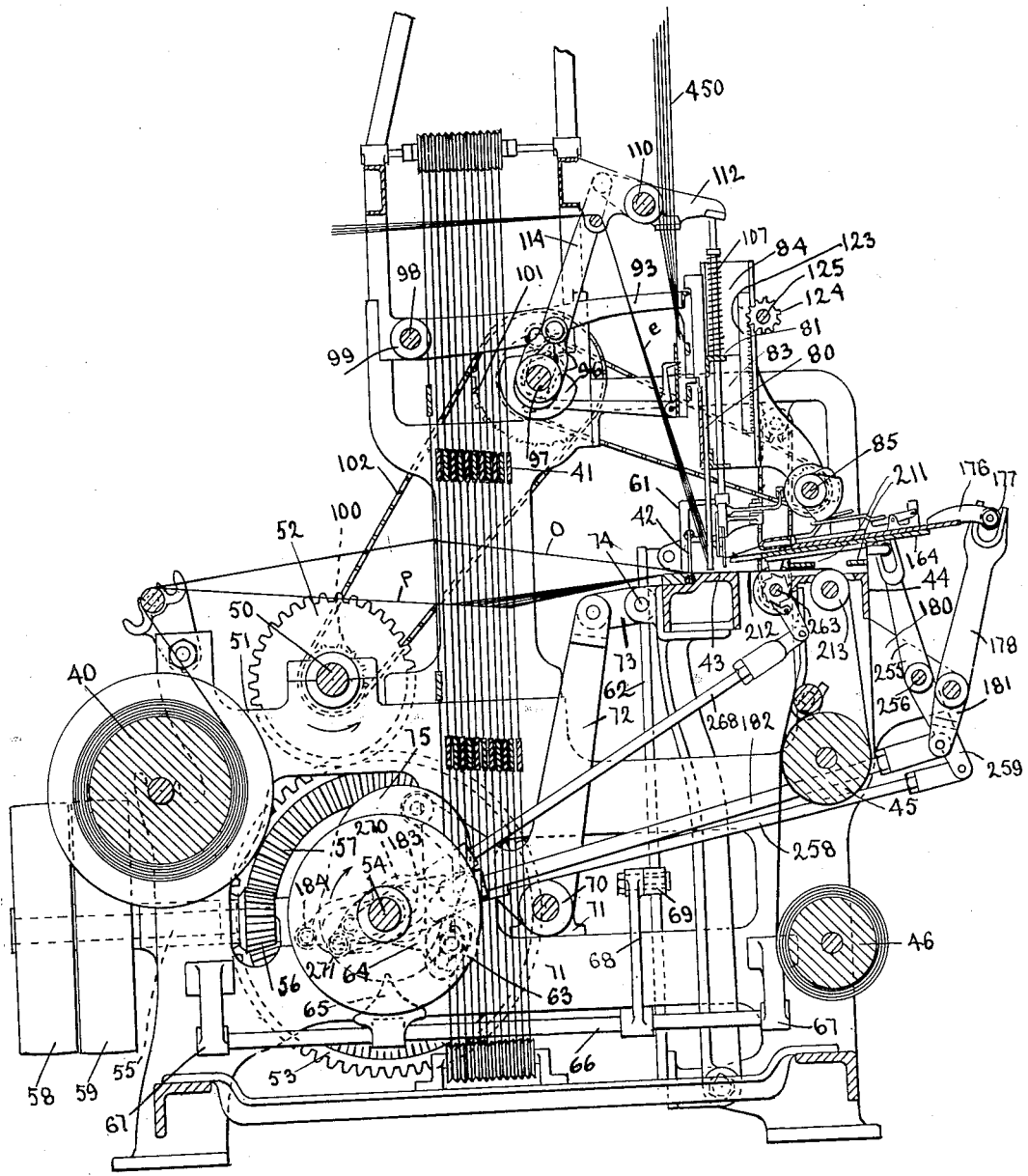
Fig. 2 is a sectional elevation substantially on line 2—2, Fig. 1.

Fig. 2—A is a diagram showing means for interrupting the action of the take up mechanism.

Figure 3A:
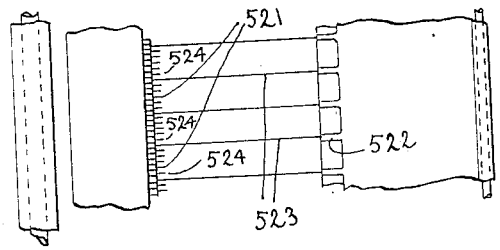
Figure 3:
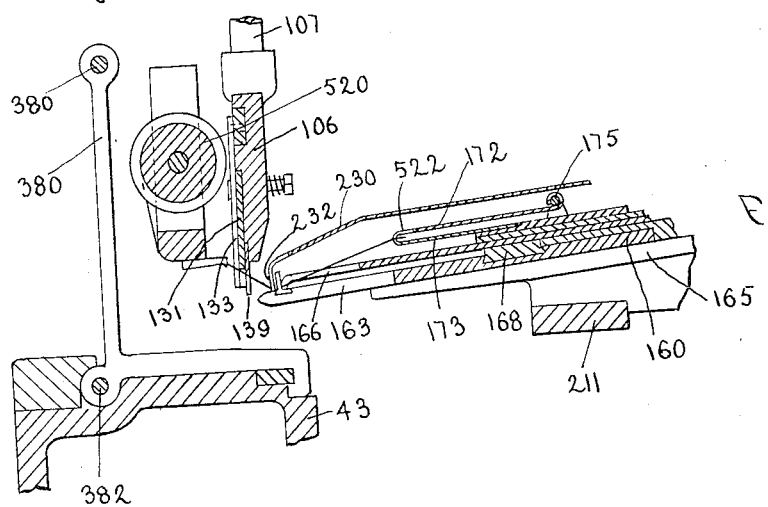
Figure 2A:
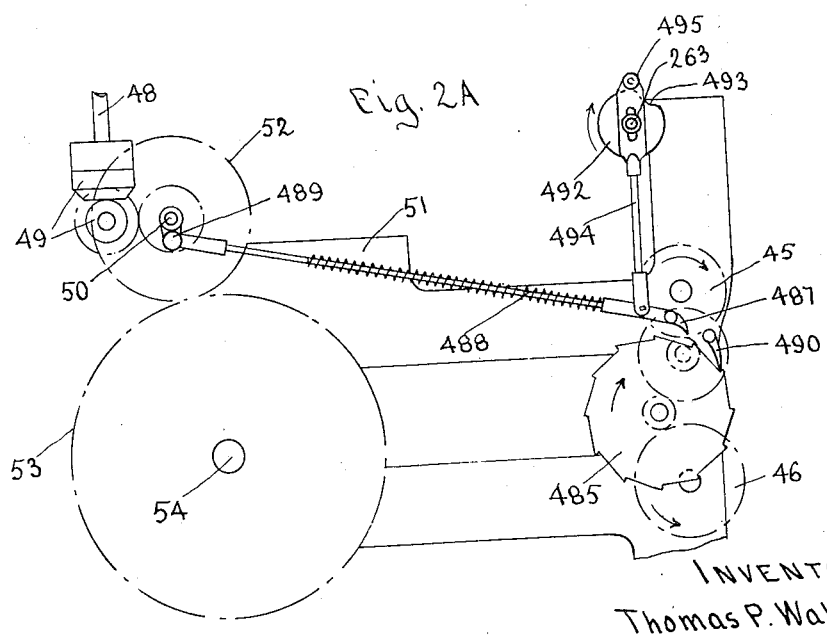

Fig. 3 is a fragment showing the application of the Axminster spool system to function with my weaving mechanism.

Fig. 3—A is a fragmentary plan showing a modified form of gripper adapted to use with the Axminster spools.

Figure 1:
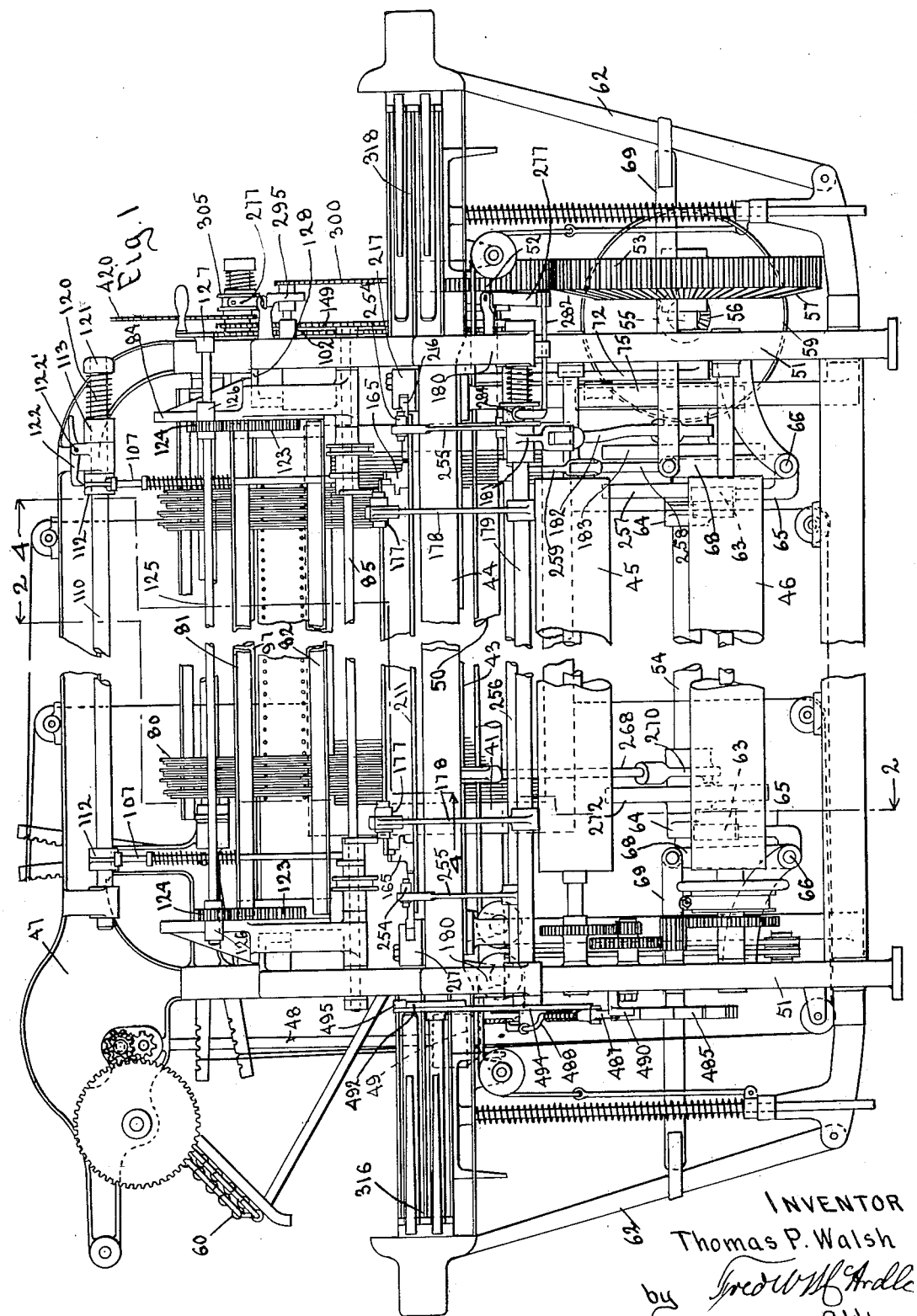
Fig. 1 is a front elevation of a loom of the fly shuttle type with which my invention is embodied.

Fig. 4 is an enlarged sectional fragment substantially on 4—4, Fig. 1, showing a portion of a preferred form of my invention.

Fig. 4—A is an enlarged fragment of a compart for guiding the yarn strands.

Fig. 5 is a further enlarged fragment of the yarn fingers.

Fig. 6 is an enlarged fragment of the yarn shear member, viewed in the direction indicated by the arrow 6, Fig. 4.

Fig. 7 is a similar fragment showing the cutter blades in position in which the plurality of yarn strands are severed.

Fig. 8 is a fragmentary sectional elevation similar to Fig. 6, showing a modified form of my invention, in which I employ a pattern mechanism different from that shown in the preferred form.

Figs. 9 and 10 show in enlarged form a modification of the yarn fingers.

Fig. 11 is an enlarged fragmentary plan showing part of the connections by means of which my invention is operated.

Fig. 12 is a fragment showing one means for laterally spacing and guiding the yarn fingers.

Fig. 13 is a sectional plan substantially on the line 13—13, Fig. 4.

Fig. 14 shows diagrammatically one means for controlling the yarn strands for successive series of knots in a line.

Fig. 15 shows some of the knots which may be made by means of my invention.

Fig. 16 is a sectional elevation substantially on the line 16—16, Fig. 13.

Fig. 17 is a sectional elevation substantially on line 17—17, Fig. 13.

Fig. 18 is an enlarged sectional elevation substantially on the line 18—18, Fig. 13, in which the yarn strand is shown in position ready to be severed.

Fig. 19 is a fragment of sectional plan on 19—19, Fig. 18.

Fig. 20 is a fragment showing the relation of yarn fingers to weaving blocks at time of engagement.

Fig. 21 is a similar elevation to Fig. 18 in which the yarn is shown in position for knotting.

Fig. 22 is a similar elevation to Fig. 18, in which the knotting mechanism is shown in position in which the knot has been beaten up into the fell and the ends released, the weaving block carrier being near its extreme rear movement and the yarn grippers about to move forward to engage yarn strands for another series of knots.

Fig. 23 is a fragment showing in perspective the weaving block and operating fingers.

Fig. 24 is a fragment showing detent means for the weaving blocks.

Fig. 25 is a diagrammatic view of the pattern mechanism, which I prefer to employ with my invention, one means for operating being included.

Fig. 26 is a fragmentary front elevation of the same showing the operative mechanism.

Fig. 27 is an enlarged fragmentary sectional side elevation of the upper portion of my pattern mechanism on line 27—27, Fig. 28.

Fig. 28 shows a fragment of the card belt which I employ with this pattern mechanism.

Fig. 29 shows diagrammatically the arrangement of connections between the yarn fingers and the indicating mechanism of my pattern device.

Fig. 30 shows a diagrammatic plan of my device for providing excess length in the weft or binding thread.

Fig. 31 is a plan showing operative means for providing this excess length.

Fig. 32 is a sectional elevation with unnecessary parts omitted, of the means employed for the above purpose, the elements being in position in which the excess is about to be drawn from the shuttle.

Fig. 33 is an elevation similar to Fig. 32 in which the excess has been provided and the elements about to return to initial position to permit beating up to the fell.

Figure 34:
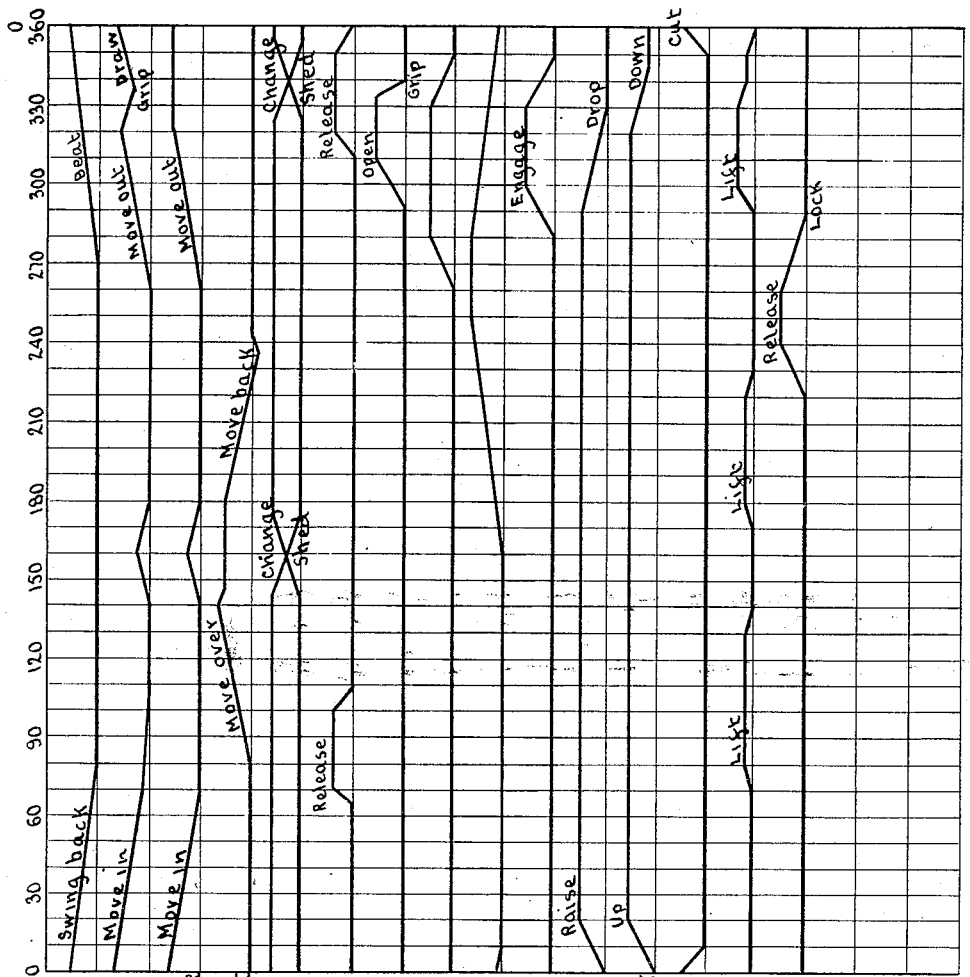
Figure 35:
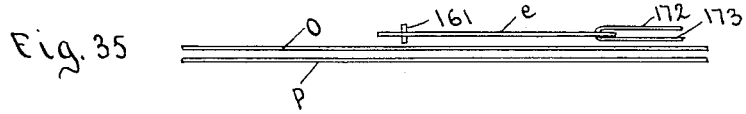

Fig. 34 is a chart showing diagrammatically the relation of the several movements required in the accomplishment of my objects.

Figs. 35–49 inclusive show diagrammatically the steps in forming several forms of knots.

In this embodiment of my invention the warp threads are led from a warp beam through harnesses and a reed, over a breast beam, to take up mechanism at the front, and the pile yarns are supplied from any suitable source such as creels, not shown, to yarn fingers, controlled relative to operating position by suitable selective mechanism, preferably of the jacquard type, although the dobby type or the Axminster spool system may be used in connection with my weaving mechanism. Fly shuttle mechanism is operated to supply one or more picks of weft or binder thread, which is beaten up into the fell with the ordinary lay beam mechanism.

Referring to the drawings—

In Figs. 1 and 2 I have shown a loom of the fly shuttle type in common use for weaving cloth in the ordinary manner. To this loom I have adapted and attached my invention with only minor changes in the original elements. There is a particular reason for this, which I will explain.

There are many looms, formerly used for cloth weaving and some types of carpet looms, that have been rendered idle for various reasons, as superfluous for the needs of the present and immediate future. My invention may be attached to many of these looms to insure a maximum production of knotted fabric, even if the looms are obsolete through the introduction of improved methods for increased production. The essential loom mechanism needed for cooperation with my invention, relates to details old in the art of weaving, and it will be obvious that the number of operations in a cycle for the production of a knotted fabric, is greatly in excess of those required for plain weaving, and must necessarily require a longer period, and fewer cycles, than would be practicable in ordinary weaving; thus a loom having a normal production speed far below that of the modern loom of the same general type, may be adapted for satisfactory service. It therefore follows that if such obsolete and idle looms can be utilized, to produce an article of commercial value, by combining certain devices therewith, a saving of capital becomes possible, obsolescence of such looms is avoided, and frozen assets released for productive use. It will therefore be understood that the description of the present embodiment of my invention will apply in principle to other constructions in which analogous elements or members in the loom are essential parts of the combination.

My invention may be in the form of attachments to such constructions, or may constitute a part of a specially constructed loom in which such essentials are included.

Returning to Figs. 1 and 2. The warp threads O, P supplied from the warp beam 40 are led through respective heddles in the harness frames 41, passing through the reed 42 rigidly secured to the lay beam 43, and the woven fabric passes over the breast beam 44 to the take-up rolls 45—46.

The harnesses are operated to form the sheds in the usual manner by mechanism not shown in detail, but indicated as mounted within the chamber 47, operating through connections 48—49 from the countershaft 50, journaled at either end in the main frame 51 and on which is rigidly secured the gear 52, meshing with gear 53, rigid with the main shaft 54, which in turn is driven from the countershaft 55 through the medium of the bevel gears 56, 57, tight and loose pulleys 58—59 providing for rotation of the countershaft from a source of power not shown. The shifting of the harnesses to change the shed of the warp threads, is governed by the rolls 60 connected to form an endless chain, the rolls being adjustable and operative on the mechanism within the chamber in a well known manner, to shift the respective harnesses to change the shed, other rolls operating in similar manner to govern the movement of fly shuttle boxes, to register with the lay beam in a manner common to this type of loom. Any other special or suitable shedding mechanisms may be used. Shuttles not shown, in the shuttle boxes, provide filler or binder thread which is shot intermittently as will presently be described, by means of the usual picker stick 62 operated from the main shaft in the usual manner, the rolls 63 rotatably mounted on the levers 64 rigid with the main shaft 54, engaging the so called "bat wings" 65 rigid with the shafts 66, journalled at 67, and on which are mounted levers 68 to which are swiveled the pitman 69, yieldingly secured to the respective picker sticks in the usual manner. In the ordinary weaving of cloth, a pick of weft is shot at each change of shed, and the particular shuttle is aligned with the lay beam according to predetermined adjustment of the governing rolls 60, a plurality of shuttles being provided according to the character and pattern of fabric. After each shot the lay beam is operated to beat up the weft to the fell and the lay beam is therefore usually actuated by crank motion from the shaft 50, geared to rotate twice for each revolution of the main shaft. Up to this point I utilize the mechanism common to this type of loom or other analogous mechanism which may vary in character according to the type of loom. Instead of beating up the lay at each change of shed, I operate my lay beam but once in each revolution of the main shaft, in the manner and for the purpose to be explained.

Instead of operating the lay beam from the shaft 50 by means of a connecting pitman, as is usually done, I provide a countershaft 70 journalled at 71 on the frames. To this shaft are rigidly secured bell cranks 72, links 73 being swiveled to the upper arm and to the fork 74 usually engaged by the connecting pitman which is replaced. The other arm of each bell crank is provided with a roll engaging respective cam elements 75 rotatable with the main shaft 54. By the use of a cam instead of eccentric or crank element, I am able to govern the movement of the lay beam to cause it to dwell inactive at its backward position, while I perform the knotting operations hereinafter described.

The cams are thus formed to dwell through approximately one half revolution of the main shaft, the operating surfaces being formed to actuate the respective bell cranks and the lay beam to beat up once in each revolution of the main shaft, in harmonic agreement with the movement due to the cranks and pitman, but after each second change of shed, instead of after each change. With this exception the loom operates without other essential change than that explained, and my invention is operated in combination with this ordinary weaving mechanism, the devices being coordinated in action with the loom operation, as will be described.

In my invention I employ a plurality of yarn guides hereinafter referred to as fingers; these fingers being arranged in groups, each finger serving as a guide for a plurality of yarn strands, which may be of varied colors. The particular yarn strand in any one of the fingers in a group is presented to the knotting mechanism by means of suitable selective means, and a section of such yarn is severed and the knot formed in each group and about two of the warp threads. The knots formed each from a single strand from each group of fingers are separated by the lateral space occupied by each group, and the spaced knots extend laterally across the loom forming the basis of a row.

As above noted, this operation is performed during the time the lay beam is at rest, and as each series of knots is completed they are beaten up into the fell.

Successive series of knots are formed in similar manner between the knots first formed, until a uniformly filled row is completed, at which time one or more shots of filling are supplied by the fly shuttles and beaten up to bind the row, the position of the shuttle boxes being controlled by the usual means as hereinbefore noted, to align a particular shuttle to be shot by the picker stick.

For convenience in describing, my invention may be divided into dependent sections relating respectively to the yarn supplying, the knotting, and the selective devices cooperating to produce the knotted fabric. Referring to the devices relating to the supply and control of the yarn strands and to Figs. 1, 2, and particularly Figs. 4 and 5, as here shown, I have arranged my yarn fingers 80 in groups of three each having four channels $a$, $b$, $c$, $d$, for separate strands of yarn. As will hereinafter be explained, any one of these channels each preferably supplying a different color of yarn, may be aligned to be engaged by the knotting device as will be described. The number of fingers in a group may be varied according to the knots per lateral inch of fabric, but limited by the sizes of the warp threads and the yarn strands, and the number of channels may also be varied to provide a reasonable range of colors, in excess of the number here indicated. Referring to Fig. 4.

The yarn fingers are slidably supported in a holder extending laterally across the front of the loom. This holder comprises girder elements 81—82 secured to the crossheads 83 slidable in the guides 84 which are swiveled for convenience on a shaft 85 used for another purpose which will be later explained. The guides may be swiveled on independent trunnions if preferred, the object of such swivels being to permit the rotation of the entire holder and supported parts for reasons to be presently explained. The fingers are guided on one edge by the girder elements 81—82 and on the other edge by a plate 86 from which project studs 87, Figs. 1 and 12, which serve to separate the groups and yet permit any finger in the group to be independently reciprocated.

I prefer to form the channels for the yarn strands as shown in Fig. 5 in which the channels $a$, $b$, $c$, $d$ are each provided with a slot 88 which permits threading with facility. The yarn strands $e$ thus threaded in their respective channels pass through the finger preferably in a direction normal to the edge, an end of each projecting toward the front of the loom, to be gripped by the knotting device when brought to selective position relative to the knotting members. In Fig. 5 I have shown a full size fragment of two contiguous groups. In each group one yarn strand is selected as will be explained, to furnish yarn for one knot for each group. In this case the contiguous groups provide respectively for yarns from $a$ in the first finger of one group and $c$ from the first finger in the second group as indicated by the dotted line $x$—$y$. As explained, each channel in a group may serve for a different color of yarn and one yarn only from any one channel of a group may be selected for use.

The yarn strands for the multiple channels are supplied from any suitable source, such as a plurality of creels, passing through guides 89′ Fig. 4—A in a "compart" element 89 extending laterally and secured to the bracket members 90 secured to and forming a part of the loom frames on either side. For convenience, I provide slots 89″ through which the yarn strands may be inserted into the respective guides.

By means of this "compart" element the yarns are spaced and separated to lead to the respective fingers.

In Figs. 9 and 10 I have shown a modification of the fingers in which the yarn channels are angularly disposed as at $a'$ $b'$ $c'$ $d'$, shelves 80′ projecting normal to the edge of each finger to insure uniform spacing between the yarn ends in each finger. While these shelves are of particular value for use with the modified form, they may be used to advantage with the preferred form when some grades of yarn are used.

In the production of a series of knots transversely of the loom, a particular yarn in each group is selected by means hereinafter described, the multiple groups being removed from registering position after lengths of yarn strands for a previous series have been drawn by the knotting device and cut to length necessary for the formation of each knot. In the drawings, Figs. 1 and 4, the multiple fingers 80 are provided near their upper ends with an abutment 91, and extending transversely of the loom beneath these abutments is the lifting element 92 secured rigidly at either end to a lever 93, projecting from which is a stud 94, on which is journaled the roll 95 engaging a cam element 96 rigid with the shaft 97, having bearings in the frame of the loom.

Referring to Fig. 2, the levers 93 extend rearwardly and are secured to the countershaft 98, journaled at 99 in the loom frames. It is not essential that both levers engage like cams, as a single cam may operate both levers through the countershaft 98 on which they are rigid. Where space permits, it is however, advisable to employ two cams to reduce torsional strains on wide looms. The shaft 97 is rotated from the shaft 50 through the medium of sprockets 100—101 and chain 102, the sprocket 100 being rigid with the shaft 50 and the sprocket 101 being journaled on the shaft 97 for reasons to be hereinafter explained, and engageable with a suitable clutch element rotatable with the shaft.

When the shaft 97 is rotated the cam 96 operates to lift the levers 93, and the lifting element 92, engages the abutments 91 on all fingers and lifts them to permit the selective mechanism to function. Whatever the type of selective devices, two of which are shown as applicable for use with my invention, and will be described later, elements of such devices are adapted to engage abutments on each finger to limit the downward movement to register the particular yarn strand in each group for each knot. In Figs. 4 and 8 in which I employ a preferred form and a modified form of pattern device hereinafter described, each finger is provided with an abutment 105 which engages selective elements operated by the pattern device, limiting the downward movement of each finger to present the end of the predetermined yarn strand for the particular knot to be made from each group of fingers, the other fingers being retained in raised position by corresponding selective elements. The extreme downward movement of the fingers is limited by another abutment 1050 adapted to be engaged by the upper edge of the plate 86 when the entire structure is swung on the shaft 85 or substituted trunnions.

The purpose of this form of structure is as follows:

When the pattern device has operated to select the required yarn strand in each group of fingers, a sufficient length of each strand is drawn from the respective fingers simultaneously, to form the next series of knots, and the strands are simultaneously severed by suitable means, a preferred device for this purpose being shown particularly in Figs. 2, 4, 6, 7, 11 and also in other figures not pertinent to this part of the description. The shear holder 106 extends transversely of the loom in front of the fingers 80, being supported by the rods 107 slidable in the girders 81—82.

Coil springs 108 of which the rods form arbors, react to yieldingly press upwardly on collars 109 secured to the respective rods. Secured rigidly to the shaft 110 having bearings in projections 111 from the arch of the loom, are the levers 112, adapted to engage the ends of the rods 107 and depress them and press the shear holder to a position in which the multiple yarn strands may be severed.

The shaft 110 is oscillated to this end by means of the arm 113 to which is swiveled one end of the pitman 114, the other end being formed with a yoke 115 engaging the shaft 97, on which is secured a cam element 116, engaged by a roll 117 journaled on the stud 118 projecting from the pitman.

The arm 113 is secured slidably to the shaft 97, a key 113′, Fig. 11, being provided to insure fixed relation with the levers 112 while permitting an axial movement of the shaft for reasons to be presently described. Normally the levers 112 are in engagement with the ends of the rods 107, and the shaft is yieldingly retained axially in a position in which this is the case, by means of the spring 120, reacting on the collar 121 rigid with the shaft, and the hub of the arm 113 slidable thereon.

At times it becomes necessary to raise the fingers together with the shear holder, out of operative position, to permit a clear space to repair broken warp threads or other trifling repairs, and in such cases the shaft 110 is moved longitudinally in the direction of the arrow (Fig. 11) against the yielding resistance of the spring 120. The levers 112 rigid with the shaft are disconnected from contact with the ends of the rods 107 and the finger holder and supported elements may be raised for the purposes mentioned, a pawl 122 hinged at 122′, Figs. 1 and 11, falling behind the hub of one of the levers 112 and retaining the shaft in position in which the levers are out of engagement with the rods 107.

I have shown a convenient means for raising this holder, in which racks 123 secured to the cross heads 83, are engaged by pinions 124, rigid with the shaft 125, rotatable in bearings 126 formed in the guide elements 84. A crank 127, secured to the shaft 125 provides means for rotating the shaft and raising the holder. As this is done only occasionally, no particular means are shown for trigging the pinion, this usually being done by inserting a metal pin between the teeth of the rack and pinion to form an obstruction to releasing. When the fingers as a body are to have the yarns replaced, or in major cases of repairs to parts behind, it is advisable to swing the holder structure out of position to provide room for freedom of action. Normally the guide elements 84, hinged at 85, engage a shelf or ledge 128, Figs. 1, 4, 11, in which position the yarn fingers, and the shear parts are in operative relation to other parts of the invention.

When swung out of position the movement may be limited and the structure supported in such position by any suitable means here shown by projecting studs 130 from the brackets 90 on either side of the loom frame, with which the guide elements engage, the position of one guide element and supported parts being shown in dots, Fig. 4. Returning to the shearing mechanism, a preferred form of which is shown, particularly as to this description, in Figs. 6, 7, 13, 18, 21, 22. Rigid with the shear holder 106 is a fixed shear blade 131, and spaced in operative relation with the groups of yarn fingers are slots 132, each formed with a cutting edge adapted to cooperate with individual shear blades 133, adapted to oscillate on studs 134, slidable axially in the holder and provided with tension springs 135, by means of which a slidable shearing contact may be maintained with the shear blade 131. The oscillating blades are extended at 136 and are engaged by studs 137, projecting from the bar 138, slidable in the holder 106, the holes in the blades being slightly elongated to compensate for the combined reciprocating and angular movement, the elongation being so slight that it is not noticeable to the eye. The slots in the fixed blades are angularly widened below the shearing point to assist in guiding the yarns from the several fingers of a group to a shearing position in the respective slots.

A cooperative element 139 is formed with serrations adapted to engage respectively with any yarn strand in a group and guide it to a central position relative to the shear slots, as the shear holder is depressed to shearing position. At this time the oscillating blades are operated by movement of the element 138 and the yarn strands from all groups, held by the knotting device, are severed, after which the fingers and shearing device are raised preliminary to providing for another series of knots.

I operate the element 138 for actuating the oscillating shear blades as follows:

Swiveled on the stud 140, projecting from a bracket 141 formed on the shear holder 106, is a lever, one arm of which 142 is provided with a stud 143, Figs. 13 and 18, 21, 22, projecting through the element 138; the lever is extended with an arm 144, projecting from which is a stud 145 adapted to engage the path of a peripheral cam 146, rigid with the shaft 85 journaled in brackets of the main frame 90. This shaft is rotated by means including the sprockets 147 rigid with the shaft 85, and the sprocket 148 rotatable with the sprocket 101, Figs. 1 and 11, and the connecting sprocket chain 149. As the cam 146 is rotated the lever including arms 142 and 144 is oscillated transmitting sliding movement to the element 138 and shearing action to the blades 133. To coordinate with other operations, this action is necessarily performed as quickly as possible, and I therefore prefer to rotate the shaft 85 twice to every revolution of the sprocket 148, in order that the angular distance on the cam 146 may be such that there may be a double oscillation of the shearing blades within the possible time allowed to insure a clean cut in case the blades become a trifle dulled in service. The timing of the cam is such that when the yarn strands have been cut, the engaging stud 145 may disengage from the cam path as the shear holder is raised by the cooperative action of the springs 108 and cam 116. During the interval that the holder is raised, the cam rotates through one complete revolution, and such part of a second revolution, that as the shear holder is again depressed the stud will engage the cam path to function as described.

As the shear holder is raised after shearing, it has been found advisable to move it outwardly from the yarn ends to prevent contact therewith and consequent tendency to bend the yarn ends from registering position. I provide means for doing this as follows:—referring to Figs. 4, 18, 19.

The rods 107 slidable in the girder members 81, 82, are provided with wedges 150, 151, and the openings in 82 in which the rods slide are elongated to permit movement outwardly of the rods, Figs. 4, 18, 19.

The wedges are so positioned with relation to the shear holder that as it reaches shearing position, the wedge 151 has engaged the element 82 and pressed the rod to engage slidably with the surface 152 of the opening in element 82, and the wedge 150 is out of engagement therewith. As the rods are withdrawn to raise the holder, the wedge 150 functions in corresponding manner to press the rods outwardly against the surface 153 as the wedge 151 is withdrawn, thus moving the shear holder outwardly as it is withdrawn upwardly. The wedges 150, 151 are cooperative for the described purpose and bevels are provided at 154, 155 to cooperate with the wedge ends to insure the required action within the least withdrawal distance.

Having described the means for supplying yarns for the knotted fabric, and collateral elements and members, I will now describe the knotting device and its relation to the foregoing members and other mechanisms of the loom and of my invention.

For convenience in description, the knotting device will be considered as that part of my invention relating to the knotting of yarn strands about the warp threads.

The device includes members for drawing the thread from the yarn fingers; elements which engage separate strands and are coordinated in action with the movement of the harnesses, to knot the yarn strands about the warp threads, and which will hereinafter be referred to as the weaving blocks; means for intermittently moving both of the above for the purpose of forming successive series of knots, together with the various operative connections and dependent elements.

Referring particularly to Figs. 13, 18, 21, 22, 23 and incidentally to Figs. 2, 4, the carrier 160 in which a plurality of weaving blocks 161 are slidably mounted, is formed with slots 162 spaced in agreement with the spacing of groups of yarn fingers.

As will be presently explained, when the carrier together with the weaving blocks is in a position where the knot is to be formed, Fig. 21, the weaving blocks are within the shed of the warp and the slots in the carrier provide clearance for the several pairs of warp threads spaced to agree therewith and with the yarn finger groups. A weaving block is slidably mounted on each of the fingers 163 formed by the slots. These will be hereinafter referred to as carrier fingers.

The weaving block carrier may be a single unit or a plurality of like elements extending laterally and supporting a plurality of weaving blocks equal in number to that of the yarn finger groups. The weaving block carrier as an element or a plurality of elements is mounted on a supporting element 164, adapted to be moved toward and from the shed as will be presently described.

This construction is preferred for practical reasons to that of forming the weaving block carrier as an integral part of this element.

I have shown the supporting element 164 as slidable in the guides 165 (see also Fig. 1) and the means by which, and the manner in which this is reciprocated will be presently described.

The weaving blocks mounted in the carrier fingers 163 and slidable laterally therewith, are adapted for reasons which will appear, to be moved to a contiguous finger and back, and one means for doing this is here shown, in which a plurality of blades 166, mounted in a holder element 167 are so spaced that in initial position they engage corresponding sides of the weaving blocks, Figs. 13, 23. The holder 167 rigid with the element 168 in slidable relation to the weaving block carrier, is reciprocated as will be hereinafter explained, and the weaving blocks are simultaneously moved in one direction from initial position on one finger to a similar position on the respective contiguous finger, suitable detent means being provided to retain the weaving blocks in either position. I have shown in Fig. 24 a means for doing this which includes a ball 169 within a socket in the finger and yieldingly pressed by a spring 170 to engage a countersink in the base of the knotter.

The slots in the weaving block carrier are thus clear to permit change of the warp shed, after which the blades engage the opposite sides of the respective weaving blocks to return them to initial position, after which the blades return to their initial position. The operating means and the reasons for the action will be presently explained.

Mounted in the guides 165 and slidable independently of the element 164, which will be hereinafter referred to as the weaving block slide, is a similar element 171 which will be referred to as the gripper slide, and on which are rigidly mounted gripper elements 172—3. These gripper elements may each be integral, extending laterally across the front of the loom and adapted to engage the yarn strands from all the groups, but for economic and practical reasons, I prefer to arrange them in suitable lengths or sections mounted on a base plate 174 which in turn is secured to the gripper slide 171, the several elements 172 being connected by suitable means to operate in unison.

A means for doing this may be to secure each element section to the arbor 175. This arbor is journaled in projections 175o, Fig. 13, from the base plate 174, suitably spaced in the length of the arbor.

The elements 172 thus hinged are yieldingly retained in engaged position with the elements 173 to grip and hold the yarn ends. The gripper slide 171, together with the gripper elements, is adapted to be reciprocated toward and from the warp shed in coordination with the corresponding movement of the weaving block slide, and I will now describe the means by which these two elements are operated.

Secured to the gripper slide 171, Figs. 2, 13, 18, 21, 22, is a fork 176 near either end of the element, in which is rotatably mounted an antifriction roll 177. A lever 178 forked at its upper end to engage this roll, is rigidly secured to a shaft 179, journaled in bearings in a bracket 180 projecting from the loom frame on each side.

The shaft is adapted to be oscillated to reciprocate the gripper slide 171 and the gripper elements. Means for doing this include the arm 181, Figs. 1 and 2, to which is swiveled one end of a pitman 182, the other end of which is engaged with a yoke through which the main shaft 54 extends forming a guide therefor as it is reciprocated by means of the cam element 183, Fig. 1, and the roll 184 engaging therewith and journaled on a stud projecting from the face of the yoke. For reasons to be presently explained, the arm 181 is rotatable on the shaft, and adapted to be engaged by a clutch member 185 rotatable with, but slidable on a key sunk in the shaft. While the several knot series are being completed to form a row, the clutch is engaged with the arm 181, and the knotting cycles are uninterrupted.

In my invention as shown, I have proportioned my elements to provide for six series of knots in a row, but may vary this number either way according to conditions, the description applying equally well in principle. When the row is finished by the completion of the last series of knots, the clutch member 185 is automatically withdrawn from engagement with the arm 181, permitting the lever 178 to remain at rest, without interrupting the oscillations of the arm 181. As the lever 178 is the actuating means for reciprocating not only the gripper slide 171 but also the weaving block slide 164 as will be presently explained, the knotting mechanism as a whole remains idle until the clutch member is again engaged.

Any suitable means may be provided for releasing and engaging the clutch member and one means coordinating with other operations, is shown and will be described in due sequence. In the process of making a series of knots, and referring particularly to Figs. 18, 21, 22, the cycle of operation of the knotting device is as follows: When a row of knots has been completed and one or more filler picks have been shot across and beaten up to the fell by the lay beam 43, the knotting device which has been idle during the throwing of the picks is connected by the engagement of the clutch member 185. Previous to the disengagement of the clutch, the grippers 172—173 have been advanced to grip and draw back yarn strands for a succeeding series of knots, and the strands are engaged with the weaving blocks, and sheared by the shearing device. In Fig. 18 the parts are shown in position in which the shears are about to sever the strands. When this has been done the shearing device and yarn fingers are raised, the lay starts on its backward oscillation, and the grippers and weaving blocks are advanced to knotting position in the shed as shown in Fig. 21. When the knots are completed, the weaving blocks and the grippers holding the respective ends of the yarns are withdrawn, tightening the knot on the warps as the knots are drawn back to the fell, both ends of the strands being released at about this point.

The withdrawal of the weaving blocks is continued to an extreme movement, the grippers are advanced to engage, and retracted to draw out lengths of selected yarn strands for a succeeding series of knots, and the cycle is repeated, Fig. 22, showing the parts near the extreme outward movement of the weaving blocks. I will now describe the relation of the elements and the mechanism by means of which I perform the several operations. While it is possible to reciprocate the weaving block slide in a similar manner to that of the gripper slide, for practical reasons I prefer to operate it in the manner to be explained.

Rigid with the gripper slide 171, is an element 195 in which is slidable the plunger 196 yieldingly pressed downwardly by the spring 197. This plunger is engaged by the forked lever 198 swiveled at 199, Figs. 13, 18, 21, 22, in the element 195, and is provided with an extension 200 to which is rigidly secured the lever 201. This lever, as the slide is reciprocated, intersects the path of the periphery of a cam element 202 rotatable with the shaft 85. Normally the plunger engages one or the other of the socket holes 203, 204, in the weaving block slide 164, and the slides move in unison, but the cam element 202 is so formed that the plunger is withdrawn by engagement of the cam element with the lever 201, as the weaving block slide reaches its extreme outward position, the plunger being retained in such position and the gripper slide being free to slide, while the weaving block slide remains at rest. Refer to Fig. 22 in which the reciprocated parts are moving outward, and the weaving block slide is near its extreme movement.

The cam element 202 has engaged and withdrawn the plunger until near release, slight further rotation of the cam element coordinating with the slide movement to release the plunger from the socket 203 with which it has been engaged.

The weaving block slide is provided with a suitable detent to retain it yieldingly in the extreme outward position, here shown by a ball 205 spring pressed to engage the countersink 206 in the weaving block slide, Figs. 18, 22.

As the slides are being reciprocated to outward position, one end of the yarn in each of the knots in a series is firmly held in the grippers until the knot has been drawn on its respective warp threads back to the fell, here indicated at 207. An extension lever 208 from the gripper element 172 moves, as the slides are reciprocated, in a path that intersects the path of the periphery of a third cam element 210 secured to the shaft 85.

It will be recalled that this shaft is rotated twice in each cycle of movements and the angles of engagement of the cam elements, 202 and 210 with the respective levers, is correspondingly increased and coordinated for quick engagement and release of the respective members.

As the knots are drawn to the fell the gripper element 172 is raised by the engagement of the cam element 210 and the lever 208, and held in open position until the two slides have been reciprocated to their extreme outward positions and the plunger 196 withdrawn, releasing the slides from one another. The cam element 183 rotated with the main shaft 54 of the loom, is formed to actuate the gripper slide through the intermediate connections described, in such manner that from the point in the cycle at which the slides are released from one another, the gripper slide is moved forward to grip yarns for another series of knots, the cam 210 retaining the gripper element 172 in open position as shown in Fig. 22, until the respective yarns are between the gripper elements, the lever 208 being then released as shown in Fig. 4 by the rotation of the shaft 85 and of the cam segment 183.

Further rotation of the cam element 183 withdraws the gripper slide to draw sufficient lengths of the yarns to provide for the knots. The yarn strands for a series of knots, as hereinbefore stated, may each be drawn from any channel in a group of yarn fingers, according as the respective color yarns are selected by the action of the pattern mechanism. Each of these yarns must be engaged with the weaving block pertaining to the particular group, and be severed, to be reciprocated to knotting position within the warp shed.

Moreover, as the several series of knots are formed, the several yarns selected must be knotted about successive pairs of warp threads which are operated to form the shed for the particular knots in such series. As noted, these sheds are formed by operating the particular harness frames pertaining to these pairs in the usual manner of weaving and with the operating mechanism unchanged in character, but adjusted by suitable arrangement of the rolls 60 to govern the action of the mechanism enclosed in the head of the loom. It will be obvious that the relation of each group of yarn fingers to the corresponding weaving block must be such at the time the yarn strands are drawn for a series of knots, that any one of the yarn strands in each group may be engaged with the particular weaving block cooperating with that group, and as the strands are drawn from the fingers by the action of the grippers, they must be in engagement with the weaving blocks at the time the shears are operated, the severed ends being retained in the blocks. It is therefore essential that the yarn strand drawn from any finger of a group be guided in such manner that it may be engaged with its particular weaving block. As there is a material variation in the lateral position of the knots in the first and the final series of knots in a row, it becomes necessary to move the entire knotting device laterally, as each series of knots is made, in order that the slots in the weaving block fingers may be aligned with the particular warp threads forming the shed for the particular series of knots.

To move the yarn fingers as well would be possible, but would add to the complication, and I prefer to compensate for the varying position of successive knots by movement of the knotting device only, as I will now explain. Referring to Figs. 13, 16, 17, 18, 21, 22, the guides for the weaving block and gripper slides are mounted on the girder members 211 extending laterally across the loom and above the breast beam 44. Sufficient clearance is allowed to permit passage of the woven web 212, extending from the fell over the roll 213, which projects above the breast beam, and over the intermediate roll 45 to the take-up roll 46, the rolls being of the character in common use for such purpose. The ends of the girder members are rigidly secured to elements 216, Figs. 13, 16, 17, formed to bear slidably in supporting elements 217, secured rigidly near the ends of the breast beam. This construction as a whole will be hereinafter referred to as the carriage. The element 217, Figs. 16, 17, is provided with a tongue 218, on which the member 216 is slidably supported, the girder members engaging the sides of the tongue at 211, to insure transverse movement only of the carriage. A flange 221 projects to bear on the upper surface of the element 216, and the carriage is thus slidable laterally of the loom to an extent and in a manner to be presently described.

In order that the angle of entrance of the knotting fingers into the warp shed may be varied, I have formed each of the elements 217 with a convex base 222 which bears on the breast beam and may be adjusted by means of the holding bolts 223, to vary the angle of travel of the slides by tipping the carriage within reasonable limits.

When the first series of knots in a row is to be formed, the carriage with its supported members, is at one extreme of its movement as shown in the plan, Fig. 13, in which the end 224 of the element 216 is slightly clear of the wall 225 of the element 217, and the carriage is moved intermittently to the other extreme as and for the purpose to be presently described.

When the first series of knots in each row is to be formed, the selected threads in each row are gripped and drawn out, to provide sufficient length to form the knot, the weaving block slide being in extreme outward position and the carriage being at one extreme of its movement, here shown as at the right hand side of the loom.

Referring particularly to Figs. 4 and 6. The yarn strands drawn outwardly by the grippers are engaged by the serrations in the element 139, secured to the shear holder 106, as this is depressed, and the yarn strands are not only guided to a position to be sheared, but also to a position in which they lead over the respective weaving blocks in position to be engaged therewith. At this time I will describe the manner in which I engage the yarn strands with the respective weaving blocks.

Referring to Fig. 18. As the strands are drawn from the fingers the cutter holder 106, descending engages the serrations in the element 139 with the respective strands, guiding them laterally over the respective weaving blocks. As the grippers are retracted beyond the weaving blocks, the strands are depressed and guided into the weaving blocks, by means which I will presently describe, and as the grippers approach their extreme outward movement, the strands are severed, leaving the strands engaged by the weaving blocks, the severed ends projecting, and the opposite ends being retained by the grippers.

I have shown and will describe one form of weaving block, but do not confine myself to this form, as it may be modified within the scope of my claims. Referring particularly to Fig. 23, the weaving block 160 is formed with a beveled base 226 slidable in corresponding guides formed in the weaving block fingers and aligned to permit the weaving blocks to be moved from one to the other of the fingers across intervening slots.

The weaving blocks in the direction of movement are of such length that when the respective blades 166 are engaged therewith on either side, as explained hereinbefore, the slots are free to permit the change of shed when the fingers and weaving blocks are advanced to knotting position.

From the base, projects upwardly a tongue 227 formed with a single angular serration 228 from the apex of which extends downwardly a slot 229.

As will be explained, the yarn strands are guided by the serrations into the slots, and retained during the drawing of the yarn strand and after severing.

Referring to Figs. 13, 18, 21, 22. I have shown means for firmly holding the yarn strands in the weaving blocks after severing. This device is omitted from other figures to avoid complication. This device includes a clamping element 230 hinged at 231 to studs rigid with the slide 164, the slide 171 being cut away to permit freedom of movement thereof relative to the slide 171. The clamping element is formed with fingers 232 adapted to engage the severed yarn end as the slides 164 and 171 are reciprocated to knotting position in the warp shed. As the slides are reciprocated an extension 233 of the clamping element intersects the path of rotation of a cam 234 rigid with the shaft 85.

This cam is so formed that when the weaving blocks are within the warp shed the portion 234′ engages the extension 233 and swings the clamp element against the yielding resistance of the spring 235, lifting the fingers 232 from the yarn ends and permitting shifting of the weaving blocks again clamping the yarn as the slides are partially withdrawn to permit changing the shed. As the weaving blocks are returned to the shed, the clamping fingers are again lifted by the cam portion 234″ and the blocks are shifted to complete the knot. Again clamping the yarn ends, the slides together with the clamping element are reciprocated outwardly and as the gripper 172 opens to release its end when near the fell, it engages and releases the clamping element from the other end. As the grippers move forward to engage yarn strands for a new series of knots, the wedge 236 secured to the slide 171, engages a cooperating wedge 237 secured to the clamping element 230, swinging it sufficiently to permit the grippers to pass beneath. As the grippers engage the yarn ends and are withdrawn, the fingers 232 operate to depress the yarn strands into respective weaving blocks, clamping the strands as the grippers reach their extreme outward position and the strands are severed.

In the interval in which the gripper slide has moved in to grip a series of strands, and out to extreme position, the plunger 196 has been held out of engagement with the weaving block slide by means of the cam 202 in engagement with the lever 201.

When the gripper slide has reached its outer position, there is a slight dwell in the action of the cam governing the reciprocation of the slides, to permit the engagement of the plunger 196 with the socket 204, and the raising of the fingers and shearing device to permit the inward movement of the slides, and the grippers and weaving blocks holding the yarn strands. Fig. 18 shows the parts in position in which the shears are about to function, and the cam 202 to release engagement with the lever 201, to permit engagement of the plunger with the socket 204.

The slides are then reciprocated inwardly to the position shown in Figs. 13, 21, in which the weaving blocks are within the shed and the gripper slide released from the weaving block slide by the withdrawal of the plunger 196 from the socket 204, has continued its inward movement to provide slack which is taken up as the knot is made, and the plunger has been released to engage with the socket 203 in the knotting hook slide.

One means for releasing the plunger 196 from the socket 204 at this part of the cycle, is similar to that already described, the cam 240, engaging the lever 241, swiveled at 242, which engages the lever 201, depressing it and withdrawing the plunger, which is released to engage the socket 203, as the cam 240 rotates and the gripper slide is advanced to its inner extreme movement.

In the foregoing I have described single groups of elements relating to the actuating of the grippers, the gripper slide and the weaving block slide, but these groups are in duplicate near each end of the sliding elements laterally, and with wide looms, there may be one or more intermediate groups all operated in unison from corresponding cams rotatable with the shaft 85.

The members which I have described dwell in this position while the knots are being made and this operation is performed in the following manner:—Referring to Figs. 13, 16, 17, the element 168, to which the blade holder 167 is rigidly secured is slidable as described to permit the blades to engage and move the weaving blocks from one finger to a contiguous one in the formation of a series of knots. The movements of the weaving blocks in relation to the change of the warp shed governs the character of the knot. In Fig. 15 I have shown some of the knots that may be made by means of my invention.

In the construction herein shown, I provide for producing a Persian knot as shown at A, and will hereinafter describe the several steps required. Others of similar character such as are shown at B and C may be made by varying the movement of the harnesses to change the shed of the warp, which may be done by adjustment of the rolls 60 in the head of the loom, according to the usual practice, together with a cooperative movement of the weaving blocks by means which I will now describe. Referring particularly to Figs. 13, 16, 17.

The element 168 is actuated to move the weaving blocks by means of a cam 245, through intermediate means comprising an extension 246 from the element 168, on which is journaled a roll 247 bearing on the periphery of the cam element 245. This cam element and its means of operation, and its action through intermediate means to operate the weaving blocks to form a knot, I will now describe, and such description will apply to a similar group of elements, similarly mounted and actuated to cooperate in moving the weaving blocks from one finger to a contiguous finger, in the formation of the particular series of knots of predetermined character. While the following description applies to the formation of the Persian knot, the application to other forms of knot will be duly explained.

Projecting upwardly from the carriage elements 216 at either end are studs 248 on each of which is journaled a cam element 245 and a pinion 249 to which it is removably secured, to rotate therewith, the connecting means here shown being a stud 250 projecting from the pinion and engaging a corresponding hole in the cam element. The stud 248 is shouldered and the axial movement of the cam element and pinion is limited by the washer 251 and nut 252. The respective cam elements are so formed that they cooperate to move the element 168 and blades 166 both ways as predetermined for the particular form of knot to be used. Engaging with the pinion 249, Figs. 13, 16, 17, 18, is a rack 253 provided with a forked element 243 in which is journaled a roll 254, engaged by a lever 255 rigid with the shaft 256, journaled in the frame extension 180. While the cam elements are each operated by similar means and in cooperation, from the shaft 256, the shaft is operated from the main shaft 54 by means including a cam element 257, Figs. 1 and 2, rigid with the shaft 54, a yoke through which the shaft extends and serves as a guide, a roll engaging the cam element and rotatable on a stud projecting from the yoke, and a pitman 258 connecting the yoke with a forked arm 259, rigidly secured to the shaft 256, corresponding with connecting means described in connection with the movement of the slides. The manner of operation is as follows:—When the weaving blocks have been moved to the position within the warp shed shown in Fig. 21, the gripper slide is released as described, from the weaving block slide, and as it moves inward to extreme position, the clamp fingers 232 are raised slightly by the action of the cam element 234', releasing the yarn ends and permitting free movement of the knotters by the blades. The shaft 256 is now oscillated by connections described, and the rack elements are drawn outwardly, rotating the cooperating cam elements 245. Fig. 13 shows one of these cam elements at the beginning of its cycle.

As the cam element is rotated in clockwise direction by the action of the rack, the roll 247 rides on the periphery and the blades 166 move the weaving blocks to the left under the warps O, and the clamp fingers are released to again hold the yarn ends. This is done as the cam element 245 is rotated to the point $245^a$, Fig. 13, a slight further rotation causing the cooperating cam element to press the blades in a reverse direction to engage the opposite sides of the weaving blocks and leave the slots clear to permit change of warp shed. Thus when the cam elements have been rotated each to correspond with position $245^b$ relative to the roll 247, the shed may be changed as the cam elements are rotated through the dwell portion indicated at $245^c$, and the warps O and P change places in the shed as the proper harnesses are operated in the usual manner. Before the shed changes, the weaving blocks are withdrawn to a position adjacent to the fell, returning to position within the shed for the completion of the weaving block movement, the clamp fingers firmly gripping the yarn end during the reciprocation. They are now lifted to release the yarn ends.

Continuing the rotation of the cam elements 245, the weaving blocks are moved in the reverse direction by the cooperating cam, the weaving blocks passing back over warps O and under warps P, and when the cam element has been rotated to a point at which the roll 247 engages the cam element at $245^d$, the weaving blocks have been returned to initial position and the knot is complete, the ends of the strands being held respectively by the grippers and the respective weaving hooks in cooperation with the clamp fingers.

The further rotation of the cooperative cam elements to the position in which the roll 247 engages the cam element at $245^e$, operates to return the blades to initial position in engagement with the weaving blocks ready for the succeeding knot series.

The gripper and weaving block slides are now withdrawn and as the knots are drawn to the fell, the ends of the strands are released as hereinbefore explained.

In Figs. 35–38 the successive steps in the formation of the Persian knot are shown in diagram. The cam elements may be replaced by similar cam elements, formed and timed to make the Persian knot reversed, or by other cam elements suitably formed to make other knots. In Figs. 39–44 inclusive and 45–49 inclusive I have shown diagrammatically the several steps in the formation of other knots, the harnesses being controlled by the usual means herein indicated, to cooperate with the cam elements formed in accordance with the general description of the cam elements 245 and operated by similar means.

Referring to these diagrams, I will briefly summarize the successive steps in the formation of the Persian knot, Figs. 35–38 and of two others, Figs. 39–44 and 45–49.

Figure 36:
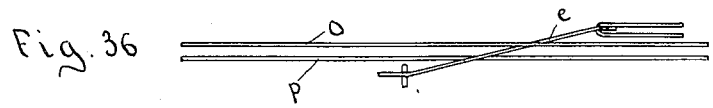
Figure 39:
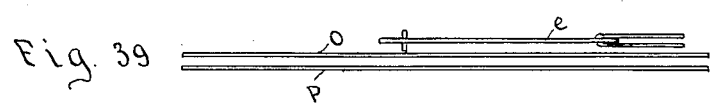
Figure 40:
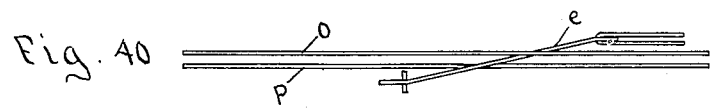
Figure 41:
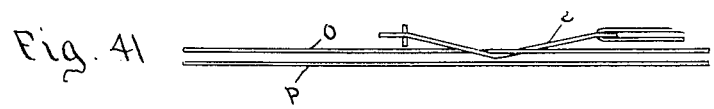
Figure 42:
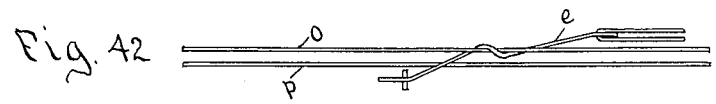

In the first, with warp O up and the warp P down, the weaving block 161 is moved under O and over P, Fig. 36, the shed is changed and the weaving block passes under P, and the knot as shown at 38 is formed. In the succeeding group 39–44 with warp O up and P down, the weaving block 161 passes under O, the shed is changed, both O and P being down as a closed shed, and weaving block 161 passes back over O as in Fig. 41, O is again raised and the weaving block passes under O as in Fig. 42 and O is again depressed to a closed shed and weaving block passes back over O as in Fig. 43 forming the knot 44 when drawn to the fell.

Figure 45:
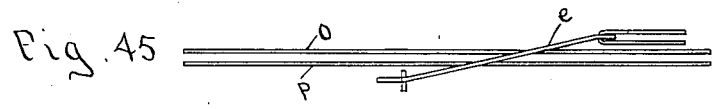
Figure 46:
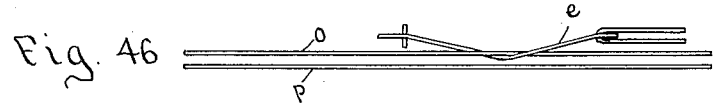
Figure 47:
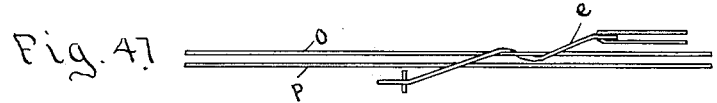

In Fig. 45 with O down and P up weaving block 161 passes over O, the shed is closed with both O and P up and weaving block 161 passes back under O as in Fig. 46, the shed is changed to bring both O and P down in closed shed as in Fig. 47, and weaving block 161 is moved across; the shed is again changed with O down and P up and the weaving block passes back under P forming the knot shown in Fig. 49 when drawn to the fell.

It is well known that a woven article at the fell, tends to be narrower than the extreme warps forming the selvage, due to the crimping of the weft thread as it is engaged by the crossing warps. I have shown means which I will hereinafter describe to obviate this tendency, but in addition, in order that the entrance of the weaving hook fingers between the warps may be assured without engagement with the warps, in entering and leaving the shed, I provide on each finger a pilot element, the character and functions of which, I will now describe.

Referring to Figs. 13, 18, 21, 22, the pilot element is formed with a shank 260 secured to each weaving block finger and extending in advance of the respective finger to a position at which it is within the line of yarn fingers as in Fig. 22, when the fingers are at their extreme outward position.

The shanks are narrowed to a less width than that of the fingers, but at their end there is an upward projection formed as shown in Figs. 13 and 16 with a spreader 261 of suitable contour to engage the upper warp threads of the shed, and guide them into the slots of the weaving block fingers. As the shed is changed they also serve as guides to insure against possible engagement with weaving blocks or fingers.

When the series of knots have been formed as explained, the grippers and weaving blocks are retracted by the action of the levers 178 actuated as described, by the respective cam element rotatable with the main shaft 54, and the knot is drawn back to the fell, the grippers opening to release the ends held thereby, and the weaving block clamp being released simultaneously, drawing away from the respective knot ends. As this takes place, the lay beam is following in the cycle and beats the series of knots into the fell, completing the cycle relating to a single series of knots which we will consider as the first series of a row.

As the lay beam returns to dwelling position, the warps are changed by the operation of a second pair of harnesses.

The warp threads from the several harnesses are operated in pairs to agree with the number of knots in an inch in width of fabrics, and the threads are spaced by the reed which is made up accordingly. It therefore follows that in successive series of knots, part or all of the mechanism relating to the knotting operation must be moved laterally to accord with successive pairs of warps presented.

To simplify the process, I provide for the movement of the knotting device only, the yarn fingers operating in fixed paths. I will now describe the means by which I move the knotting device to agree with the position of successive pairs of warps.

My invention as here presented is arranged to form rows in which there are twelve knots per inch, the yarn fingers, weaving blocks and yarn finger groups being arranged in units of two per inch. It thus follows that the knots of a series are separated by one half an inch, and the separate knots in a row by one twelfth of an inch.

The knotting mechanism to function uniformly must thus be moved one twelfth of an inch from the position occupied while the former series of knots were being made. To accomplish this I have adopted the means I will describe.

Referring to Figs. 1, 2, 4, 13, 14, 16, 17, mounted in bearings 262, secured to the frame members and between the breast beam and the lay beam, is the shaft 263, rotated step by step by the ratchet 264 rigid with the shaft and engaged by the pawl 265 swiveled at 266 on the lever 267, a pitman 268 swiveled thereto at 269, connecting with the yoke 270 through which the shaft 54 passes forming a guide therefor. The roll 271 rotatable on a stud projecting from the yoke engages a cam element 272 rotatable with the shaft 54. At each rotation of the shaft 54, the shaft 263 is rotated through an angular distance determined by the number of series of knots together with the number of picks of binder or filler thread.

In the case here shown, I provide for six series of knots, and two picks of binder thread for each row, and the shaft 263 is thus rotated through one eighth of a revolution, at each revolution of the main shaft.

Mounted rigidly on the shaft 263 are a pair of cooperating cam elements 273. Rotatably mounted in the carriage members 216 at either end are the rolls 274, engaging the respective cam elements, Figs. 13, 14, 16, 17.

These two cam elements are equivalent to a single peripheral path cam, but the construction is preferred as one in which the strains are divided. For brevity, I will describe the action as applying to a single path cam for the same purpose. The cam element 272 on the main shaft 54 is formed to oscillate the pawl lever 267 in such a manner, that the shaft 263 and cams will be rotated through the required arc intermittently in each oscillation for reasons which I will now explain. Referring particularly to Fig. 14, I have shown diagrammatically, a group of yarn fingers 80, a weaving block 161, the grippers 172, the cam elements 273, one roll 274, and one serration in the element 139, relating to the particular group. These elements are shown in each of two positions, the series being indicated by Figures 1–6 and the several positions of the foregoing elements by corresponding figures according to the knots and the step by step rotation of the cams 273.

When the first series of knots in a row is to be made, the respective knotters 161 are in such relation to the groups 80 that as a strand e from each group is drawn out by the grippers 172, 173, it will pass over the respective weaving block as at 1', the serration serving as a guide. The cam elements have been rotated partially from a nominal initial point, and dwell with the roll at 1'' until after the strands have been severed and the parts are moving inward to knotting position. The cam element then completes its movement for the particular step as indicated relative to the roll at 1''', dwelling at such position until actuated in the next cycle of the shaft 54 when the cam elements 273 are further rotated as indicated at 2'', the relation of the weaving blocks to the yarn fingers being unchanged. At this position the cam elements again dwell as in the making of the first series of knots while the yarn strands, one from each group are drawn out and severed, and as the parts are moving to knotting position, and before the pilots reach the apex of the shed, the cams are actuated to complete that stage of rotation, the roll being relatively at 2''' and the weaving blocks at 2''''.

As this second series of knots is drawn back to the fell, the cam elements are again rotated for the third series of knots the relative position of the weaving blocks being at 3' and the roll 3'', the same cycle following, and the relative position of the roll and weaving blocks being respectively 3''' and 3''''. The same movements of the cycle form the fourth series of knots, the relative positions of roll and knotting position being respectively at 4''' and 4''''.

Referring to the relation of the finger groups, the corresponding weaving blocks and the movement of the cams, it is evident that if the yarns were drawn from the finger groups with the weaving blocks in the relation to the finger groups shown at 4'''', as in the previous series of knots 1 to 4 where the cam elements dwell as the yarns are engaged and drawn for the succeeding series of knots, the yarn strands would not engage the respective weaving blocks, the cam elements are therefore formed in such manner, that in both the fifth and sixth series of knots the weaving blocks return to a position as shown at 5', 6', the equivalent position of the rolls 5'', 6'', being at the same rise of the cams as 4'', the weaving blocks and grippers being moved in the cycle before the pilots enter the shed, to the respective positions 5'''' and 6'''', the relative positions of the roll being 5''' and 6'''. It will thus be evident that the weaving blocks, and grippers, are moved intermittently, one twelfth of an inch for each series of knots, the equivalent rise of the cam elements totalling five twelfths of an inch at the end of the forming of the sixth series of knots, which completes a row. When this row is completed, the weaving blocks and grippers are withdrawn, the carriage is returned to the initial position in which the weaving blocks are at the same position as 1' and the equivalent position of the roll, 7'' is at the point the strands for the first series of a succeeding row are drawn out and severed, and as the cam elements are rotated to position in which the roll is at 7''', the clutch 185 is withdrawn from engagement with the hub of the lever 181 and the shaft 179 dwells, the weaving block slide and gripper slide dwelling in readiness to be operated to form the first series of knots in the succeeding row. At the same time the rotation of the shaft 97 is similarly interrupted, and the yarn fingers and shearing device dwell, during the time necessary to throw two picks of filler or binder. The operative means for disconnecting both shafts 97 and 179 will be presently explained. The above mentioned parts remain inoperative during two revolutions of the main shaft 54 in which the shuttle supplying the filler or binder is thrown by the cooperative action of the picker sticks, for two picks, the warp shed being changed for each pick, the picker sticks being actuated in the usual manner from the main shaft, and the alignment of the shuttle boxes with the lay beam being controlled by the action of the rolls 60 in the loom head, all in the usual manner employed in looms of this type.

A part of my invention relates to the means by which I provide an excess length of filler or binder in each pick, but before describing this device, I will describe the means by which the shafts 97 and 179 are rendered inoperative during the interval in which the shuttle is thrown and the picks beaten up into the fell. Referring particularly to Figs. 1, 11, the cam shaft 263 is not disconnected during the time the shafts 97 and 179 are rendered inoperative, and the intermittent rotation is uninterrupted. Rigid with the shaft 263 is a cam element 275, in engagement with which is a roll 276 journaled on a stud projecting from one end of a lever 277, swiveled at 278 in a bracket 279 rigidly secured to one frame of the loom. The other end 280 of the lever is swiveled at 281 to an element 282 formed with a fork 283 in which are journaled rolls 284, engaging the clutch element 185.

This clutch element is provided with a projection 285, adapted to engage a corresponding socket 286 formed in the hub 288 of the lever 181. A coil spring 289 for which the shaft 179 forms an arbor, operates on the clutch element 185 to retain it normally in engagement with the hub 288 of the lever 177. As the clutch element 185 is slidable on the key 290 in the shaft 178, and oscillates therewith, the weaving block slide and the gripper slide are thus operatively connected through the medium of lever 177, with the shaft 179. When the knots in a row have been completed as hereinbefore described, the roll 276 is engaged by a raised portion 291 of the cam 275 and the lever 277 is rocked on its swivel, and the clutch projection 285 is withdrawn from the socket 286. Referring to Fig. 14, this action is complete when the cam elements 273 have been rotated to the point at which the roll 274 is at 7''.

The intermittent rotation of the cam 273 is continued, the carriage dwelling while the two picks of filler or binder are thrown, and the cam 273 is rotated to a position in which the roll 274 is again at 1'', at which point the roll 276 is released from the raised portion of the cam 291, permitting the projection 285 to engage the socket 286, as the lever 181 is oscillated to its extreme position by the rotation of the cam.

The weaving blocks and grippers, with the strands for the first series of knots in equivalent position shown at 1, 1', 1'', when the clutch is engaged, then function to form the next series of knots, repeating the several cycles to form the next complete row.

As above noted, the shaft 97 is disengaged from operation simultaneously with shaft 179, and I have provided means including a similar cam element 295 rotatable on a stud 296 projecting from a bracket 297, Figs. 4 and 11, rigid with the frame of the loom. Sprockets 298, 299 respectively secured to the shafts 263 and the cam element 295 are connected to drive in unison by the chain 300.

Similar connections to those already described, operate to interrupt the rotation of the shaft 97, and include the lever 301 swiveled at 302 in a bracket 303 projecting from the frame of the loom, a roll 304 at one end engaging the cam element 295, the other end being forked, and provided with rolls 305 engaging the clutch elements 305, slidable on a key 306 sunk in the shaft 97. This clutch element is provided with a projection 307 adapted to engage a corresponding recess 308 in the hub of a sprocket 309, the purpose of which will be later described. The coil spring 310 reacting on the collar 311 rigid with the shaft 97 yieldingly presses the clutch element 305 to normally engage the projection 307 with the recess 308. The sprocket 309 together with sprockets 244 and 101, are journaled on the shaft 97 and connected by suitable means to rotate in unison, and are rotated from the shaft 50 by means of the sprockets 100, 101 and chain 102, hereinbefore described. The cam 295, rotated in unison with the cam 275, operates in like manner through the intermediate connections described, to release the clutch member 295 from engagement with the hub of the sprocket 309, during the same interval, the shaft 97 remaining at rest with all members operated by the cam elements secured thereto.

As hereinbefore stated, in order that there may be supplied an excess length of filler or binder as the shuttle is thrown, I provide the following means:—

Referring particularly to Figs. 30, 31, 32, 33, and also to Figs. 16, 17, when the fly shuttle 315 has been shot across and is in its shuttle box 316, Fig. 30, and the lay beam has beaten the pick up to the fell, the warp shed is changed and the pick of filler or binder K is held in position by the crossed warps, as the lay beam 43 is swung backward, the strand K' drawing from the shuttle with little displacement of the thread itself. When the shuttle is shot in the opposite direction toward the shuttle box 318, ordinarily the pick would extend substantially as shown at 317 and would be beaten up to the fell at the next swing of the lay beam.

The length of the pick while slightly in excess of the width between selvages, would be insufficient to provide for the crimping due to the crossing of the warp threads thereabout. There is therefore a strain on the pick with the result that the web is narrower at the fell than the distance between the outer warps at the reed. To obviate this, I provide means operative to draw from the shuttle, sufficient excess of filler or binder thread to supply ample length for crimping by the crossing warp threads, to prevent tightening of the pick on the selvage warps and the narrowing of the fell. One such means includes elements which are operated to engage the filler or binder threads and draw an excess length from the shuttle before the warp shed is changed and the lay beam operated to beat up the pick to the fell, and in addition, I form my reed in such manner that the warps shall be guided to the forward edge of the lay beam, retaining the spacing as the lay beam beats up.

I will now explain the means by which this is accomplished. In the diagram, Fig. 30 and Plan 31, the elements 320 are respectively engaged by the filler or binder thread close to the fell 207 before the shuttle 315 is shot across for the next pick. The shuttle is shot as the lay beam swings back from the fell reaching its opposite box about the time the lay beam reaches its extreme backward swing. Before the shuttle is shot, other elements 321, 322, supported by the lay beam, are projected between the path of the shuttle 323 indicated by dot and dash line, and the pick already beaten up. A third element 324 normally resting below the level of the path of the shuttle, is actuated to engage the pick after the shuttle is shot, for the purpose of drawing an excess length therefrom. As the shuttle is shot from the shuttle box 316, the pick is engaged by the element 320 nearest that box, preventing loosening of the beaten up pick as the new pick is drawn about the element 321, extending substantially as shown in broken line 325, the strain being taken by the element 320, thus preventing uneven or saw tooth selvage, as the shuttle reaches the opposite box 318. The element 324 now swings forward engaging the pick and drawing it out, the elements 322 cooperating. As the lay beam reaches its extreme back swing the several elements are disengaged to return to initial position leaving the pick substantially as shown in full line 326, and it is then beaten up to the fell on the next swing of the lay beam. The relation of the several elements, and the supporting and actuating means are shown in Fig. 31, in plan, and in connection with this figure and Figs. 32 and 33, I will describe the operation.

In Fig. 32 the lay beam is shown in position, swinging backward, in which the shuttle has been shot, the elements 320, 321, 322 are in operative position and the element 324, is about to be operated to draw the required excess, and in Fig. 33, the lay beam is near its extreme backward swing and the devices are about to be released to return to initial position, after functioning.

Referring particularly to these figures and also to Figs. 16, 17, and 31, the element 320, is in the form of a pin which may be depressed as the elements are operated. Each element is mounted in a lever 330, journaled on the shaft 263 in suitable relation to the selvage warps on either side. Integral with this lever is a downwardly extending arm 331 adapted to be engaged by a swinging abutment 332 journaled on the shaft 333 which is journaled in brackets 334 secured to the breast beam. This abutment is provided with an extension 335, adapted to be engaged by an arm 336 projecting from the lay beam 43. A spring 337 secured at one end to the breast beam and at the other to the lever 330 retains the element 320 normally out of operative position as shown in dotted lines, Fig. 29.

As the lay beam starts its backward swing, the arm 336 engages the extension 335, and the abutment is swung to engage the arm 331 and the elements 320 are swung downward outside the warps of the selvage on either side, and as the shuttle is shot from either box, the pick engages the contiguous element 320. Near the extreme of the backward swing of the lay beam, the arm 336 passes beyond and releases the extension 335 and as the lay swings forward the extension is swung inoperatively by the arm, and swings backward into the path of the arm at 337, as the lay beam beats up to the fell.

The elements 321 and 322 are operated as follows:—Secured to the shaft 340 journaled in brackets 341 rigid with the lay beam, are the levers 342, respectively engaging the elements 321, 322, slidable in bearings 343, secured to the lay beam.

Normally these elements are in inoperative position, the pointed ends 344 being withdrawn into the respective bearings, a spring 345, secured at one end to the lay beam and the other to a stop lever 346 secured to the shaft 340, exerting a yielding tension to rotate the shaft to withdraw the elements, the rotation being limited by the stop lever engaging the lay beam 43. A pawl 347 journaled on the shaft 340 is formed with a slot 348 into which extends a pin 349 projecting from the lever 342. Secured to the shaft 333 is a lever 350 formed with a portion 351, which may intersect the path of travel of the pawl 347 as it is swung with the lay beam. Normally, the portion 351 of the lever 350 is out of the path of the pawl 347, but during the interval in which the picks are to be thrown, the portion 351 is swung upwardly by means which I will presently describe, and as the lay beam swings toward its back position the pawl end engages the portion 351 and is swung to engage the slot 348 with the pin 349, actuating the respective levers 342 to project the elements 321 and 322 into operative position as shown in Fig. 29.

As the lay beam approaches its extreme backward swing, the pawl is released from engagement with the portion 351, the elements 321, 322 are withdrawn and the pawl swings inoperative when the lay beam beats up. A single pawl 347 and lever 350 may be employed to oscillate the shaft 340 and project the elements 321, 322, but I prefer to use duplicate elements near the opposite selvages to equalize strains, especially with a wide loom. In cooperation with these projecting elements is the stretching finger 324, which is operated in like manner to the means operating the elements 321, 322, a lever 355 rigid with the shaft 333 extending toward the breast beam, and provided with a projection 356, adapted to swing into the path of a pawl 357 adapted to function in a manner similar to the pawl 347. The stretching finger 324 is rigid with a lever 360 journaled on a shaft 361 supported in brackets 362 secured to the lay beam. Secured to the lever 360 by any suitable means here shown as a pin 363, Fig. 30, is a pinion 364 rotatable on the shaft 361, and meshing with a gear segment 365 journaled on the stub shaft 366 rotatable in brackets 367 secured to the lay beam and from which projects a stud 368 which engages a slot 369 in an extension of the pawl 357.

The stretching finger or fingers normally lie below the surface of the lay beam in a channel 370, Fig. 31, formed therein, and is retained in such position by suitable yielding means here shown as a coil spring 371 acting to rotate the segment 365, and the pinion 364 to retain the stretching finger inoperative.

The relative position of engagement of the pawl with the projection 356 is adjustable by means of the adjustment screw 372 extending into the slot 369 to serve as an abutment with which the stud 368 engages, and the distance through which the finger 324 swings is varied accordingly, a check nut 373 retaining the abutting point of the screw 372 in adjusted position. This finger 324 as well as the elements 321, 322, remain normally inactive with the levers 350 and 355 out of operative position except when picks are to be thrown, and the levers are then swung to operative position as I will explain. Rigid with the shaft 263 is a disc cam 375, intermittently rotatable as described hereinbefore.

An arm 376 rigid with the shaft 333 engages near its end at 377 with the periphery of this disc and during the interval in which the several series of knots are being made the levers 350 and 355 are in such position that the portion 351 and the projection 356 do not intersect the respective paths of the pawls 347 and 357, as they are swung with the lay beam. The disc cam is provided with a portion 378 of greater radius and as the cam shaft is rotated intermittently to the position occupied when a pick is to be thrown, this portion 378 engages the end 377 rotating the shaft 333, and the portion 351 of the lever 350 and the projection 356 of the lever 355 are swung into the respective paths of movement of the pawls 347 and 357 there to remain until the operations incident to providing excess length for the final pick has been completed, at which time the further rotation of the shaft 263 permits the lever end 377 to swing to engage the smaller radius of the disc cam and the levers 350 and 355 to swing out of operative position. In Fig. 33 the elements I have described are in a position in which the respective functions have been completed and the several actuating elements are about to be released and the device return to initial position as the lay beam reaches its extreme backward swing.

In cooperation with the above described device, I have provided an improved form of reed, and referring particularly to Figs. 31, 32, 33 the reed comprises the stamped blades 380 perforated to engage arbors 381, 382, collars 383, Fig. 31, spacing the blades as predetermined. The arbors 381, 382 are provided with threaded ends, and the reed elements being assembled, nuts 384 are tightened against the outer collars to retain a rigid structure. The outer end of the arbors are extended to engage a holder 385 recessed to provide for nuts 386 by means of which the reed structure may be secured thereto, the holder being formed with a flange 387, adapted to be secured to the usual reed support 388 of the lay beam.

A particular feature of this form of reed is the extensions 390 of the stampings 380. These extend across the lay beam forming channels in which the warp threads are guided and collectively the extensions provide a path over which the shuttles may pass without contact with the lower warps of the sheds. The enlarged portion 391 of the stampings provide abutments engaged by the clamping bar 392, and at the front end a slotted bar 393 spaces the bars, Figs. 18, 21, 22, 33, and provides means engaging the tongue 394 of the extension, for securing the reed structure rigidly to the lay beam.

Referring now to pattern devices which may be used in the selection of the particular yarns for a series of knots.

In Figs. 4, 25, 26, 27, 28, 29, I have shown the improved pattern device that I prefer to use, based on the jacquard principles, and in Figs. 3, 3—A and 8, I have shown modifications. Referring at this time to the former device, and particularly to Fig. 25, in which I have shown diagrammatically a pattern device embodying this part of my invention.

The device includes means for supplying a plurality of perforated cards in the manner in common use with the jacquard pattern devices, including a drum 400 rotatably supported by hangers 401, perforated cards 402, connected to form the belt 403, and movable intermittently by the conveyor chains 404, passing over the sprockets 405 and 406, secured on shafts 407, 408, journaled in the frame 409, the chain having studs 410 adapted to engage corresponding perforations 410'.

The shaft 408 is rotated intermittently by pawl and ratchet means, the ratchet 411 being secured to the shaft 408 and the pawl 412 being swiveled on the lever 413 to which is swiveled the pitman 414 formed with a yoke engaging the shaft 415, which is rotatable in bearings formed in brackets 416 secured to the frame 409. A roll 417 journaled on a stud projecting from the pitman 414 engages the cam element 418 rigid with the shaft 415, and the shaft is rotated in unison with the main shaft 54, by means of the sprocket 419 and chain 420 from the sprocket 309 rotatable on the shaft 97, Fig. 13. A jacquard like head is used, including the guide frame 425, the indicator wires 426 slidable therein, the lifter wires 427, the stop bars 428, the lifting grid 429, and means for reciprocating the grid, which comprises the crossheads 430 on either side, slidable in guides in the frame 409, and to which the knives of the grid are secured. The crosshead is reciprocated in the following manner:—Links 431 are swiveled at one end to the crossheads and at the other to levers 432, rigid with the counter shaft 433 journaled in brackets 434 supported by the frames 409. To the arm 435 rigid with the shaft 433 is swiveled one end of the pitman 436, the other end being formed with a yoke engaging the shaft 437. A roll 438 is journaled on a stud projecting from the yoke and engages the cam element 439 secured to the shaft 437. This shaft is rotated from the shaft 97 by means of the sprocket 440 secured to the shaft 437, the sprocket 441 secured to the shaft 97 and the connecting sprocket chain 442.

The improvements in this form of pattern device, forming a part of my invention, relates to the means which I use in connection with this pattern device, for governing the movement of the yarn fingers 80 to present a selected yarn in each finger group to the gripper members; to the means employed, for interrupting the functioning of the device, and to the form of cards, and the means I use for indicating and controlling the movement of the yarn fingers to supply the selected yarns in each group of fingers.

The elements and members described apply in general to the usual head, and operating means of the jacquard form of pattern device and I will now describe the improvements I have made, and which comprise this part of my invention.

Thus in Figs. 27 and 28 four of the five hooks 445 are pressed away from the paths of their respective knives 429. The remaining hook being engaged by its knife is therefore the particular one lifted. As all five of the hooks are connected with the element 452, it will be evident that this element is lifted a distance corresponding with the length of the particular hook 445 as compared with the inoperative hooks. The element 452 is retained in this position, as will be explained, and each of the fingers 80, lifted by the cross bar 92, moves downward when the lifting means permit, until it engages its corresponding element 452, adjusted as above explained to bring a strand from each group of fingers into operative position with the gripper elements 172—173, (Fig. 4). In Fig. 27, the particular strand required, is governed by the rear hook 429 in one of the three fingers of a particular group and in each of the other fingers the front hook is engaged by its corresponding knife and the element 452 lifted and locked in such position, that no strand from the respective finger can be engaged by the gripper members 172—173.

In the form of my invention herein shown and described, I provide for a plurality of finger groups, each group comprising three fingers 80, in each of which I provide channels for four yarn strands, one strand from each group being selected for each series of knots, and the other fingers of each group being inopertive, all as hereinbefore described.

I therefore use five lifting and indicating wires for each finger, the hooks 445 of the lifting wires varying in distance from the stop bars 428, each lifting wire slidably engaging the loop 447 formed in a corresponding indicating wire 426, the hooks being in position to engage corresponding knives of the grid when the grid is at its lowest extreme travel and the lifting wires being formed in the usual manner with a loop 448 at the lower end terminating in a hook 449, for the purpose of engaging a corresponding stop bar. The relation of the hooks in the several series of lifting wires to the respective knives of the grid is such that as the crosshead is reciprocated to its upper extreme of travel, the lifting wires will be lifted a distance corresponding respectively with the distance between channels on each of the fingers 80, unless means are provided for pressing the hooks away to clear the paths of the respective knives of the grid, as it is reciprocated to its upper extreme.

From the loops formed on the lifting wires, extend cords 450 passing through a compart 451, Figs. 4, 25, suitably supported, a cord from a lifting wire in each series connecting with a single element 452 substituted for the lingo commonly used to withdraw the lifting wires.

This element, however, functions for another purpose as I will explain.

Referring to Fig. 4, each of the elements 452 which will hereinafter be referred to as the abutment slides, is provided with a projection 453, extending into the path of movement of the shoulder 105 formed on the respective yarn fingers.

The abutment slides, one for each yarn finger, are slidable in a box like holder extending between the loom frames, the abutment slides engaging slidably with the back plate 454 of the said holder, the abutments aligning with the respective fingers. From the lower end of each abutment slide extends an arbor 455 slidable in the bottom element 456 of the holder, a spring 457, abutting the bottom element and the collar 458 secured to the arbor, and exerting a yielding pressure to return the abutment slide to initial position after functioning.

The several cords from a lifting wire of each series connect with each abutment slide as shown at 459, and as the selected wire is lifted by the respective knife in the grid, the abutment slide is lifted accordingly, the yarn fingers being in lifted position at the time the grid is raised, the girder member 92 engaging the abutments 91 on all the yarn fingers.

Returning to the pattern device, Figs. 25, 26, the cards may be made to indicate the yarn strands to be used in a single series of knots, but I prefer to utilize a single card for indicating six series by means of groups of perforations, which I have referred to as B C D E F A to agree with corresponding series of knots in a row, as I will presently explain. As previously stated, in addition to the six series of knots in a row, there are two picks of filler or binder thread, requiring eight revolutions of the main shaft 54 for a complete row of knots. As the shaft 415 is rotated in unison with the main shaft, the cam 418 operates to oscillate the pawl lever 413, and the pawl engages the ratchet 413 and rotates the shaft 408 and sprocket 406, the diameter of the sprocket being so proportioned to the angle of oscillation of the lever that the card is moved a predetermined distance equal to the distance between one series of perforations and the next, and the axes of the perforations are aligned with corresponding indicator wires in the head.

When a row of knots is completed, it will be recalled that the required yarns for the first series in the next row of knots, have been drawn from the yarn fingers and severed, before the mechanism operating the knotting and gripper slides have been released, to render the knotting mechanism inoperative while the filler or binder picks are being thrown. I therefore indicate this series of knots on the card perforated for the last five series of the preceding row, as at A. While the picks are being thrown the card belt is advanced by two steps to register the second series of knots at B. The card as it is thus moved passes in front of the indicator wires clearing them when the wires are in normal forward position.

The card, advanced to its indicating position, is provided with a single perforation relating to each yarn finger, the position of such perforations determining the lifting wire to function and the particular yarn in each finger group selected for a knot in the particular knot series. Referring to Figs. 27, 28, the cards are shown in indicating position for the second series of knots in a row, the perforations being arranged to indicate the yarn in the lowest channel of the first finger in the first group as at B′, the third channel in the first finger of the second group as at B″, the second channel in the third finger of the third group, etc.

The indications for the other fingers of each group are shown on the line B‴.

At this time and before the lifting wires are operated by the reciprocation of the grid member, the card is pressed toward the indicator wires. The cards are pressed into indicating position by the following means. Levers 465 are journaled at 466 on studs 467 projecting from either frame 409 and to these levers is rigidly secured the beam 468 perforated to align with all the indicator wires 426 in the head. Normally the beam 468 is out of engagement with the card belt which may be moved as hereinbefore described. When the belt is in indicating position the beam is swung to engage the card and press it toward the ends of the indicator wires, and the particular wires aligned with the perforations in the card and the beam, will be unaffected, and the hooks on the corresponding lifting wires will be engaged by the corresponding knives in the grid and be lifted thereby as it is reciprocated to the upper extreme movement, all other indicator wires being pressed backward by the imperforate surface of the card, the corresponding lifting wires being pressed out of the paths of the corresponding knives of the grid. The beam 468 is operated to function, in the following manner:—The arms 469 respectively integral with the levers 465, are provided with projecting studs on which are journaled rolls 470 engaging cam elements 471 rigid with the shaft 437. The abutment slides are locked in position determined by the lifting wires, by the following means:—Referring to Fig. 4, secured to the shaft 475 journaled on ears 476, projecting from the back plate 454 of the abutment slide holder, are the arms 477, to the ends of which and extending between is the lock bar 478 adapted to be swung through the slot 479 to engage the edges of the abutment slides in which are formed notches 480 spaced to agree in position with the several positions to which the abutment slides may be moved by the lifting action of the grid. Integral with one of the arms 477 is the lever 481, its end engaging the cam elements 482 rigid with the shaft 97, the spring 483, exerting a yielding tension to hold the lever end in position in which the lock bar is in engagement with the abutment slides, when at rest.

Preceding the action of the lifting wires, the cam element rotates to engage and swing the lock bar, releasing it to permit the raising of all the abutment slides to indicated position, the cam then disengaging the lever to permit it to swing to engage the lock bar with the particular notch in each abutment slide, selected by the indicating means. As the yarn fingers are lowered by the action of the cam element 96 on the levers 93 and the girder 92, the shoulder 105 of each finger will engage the corresponding abutment limiting the downward movement of the fingers, to align the particular channel indicated in each finger group, with the grippers.

These operations are repeated for each knot series in a row, and the card belt is moved by the means described in the interval during which the picks are thrown, the indicator means operated from the shaft 437 being interrupted to accord with the interruption in the functioning of the weaving device.

Referring to Figs. 1 and 2—A, the means for rotating the take-up rolls is the same as that used in the looms of this type, including a ratchet wheel 485 rotated intermittently by a pawl 487 yieldingly connected to a pitman 488 reciprocated by the crank 489, rotatable with the shaft 50, the ratchet being geared to rotate both the take-up rolls 45, 46, in unison, and to be retained in rotated position by a checking pawl 490 swiveled to the frame of the loom.

In the loom as operated for ordinary weaving, two picks are thrown during each rotation of the shaft 50.

In the loom as combined with my invention, the tension on the web of knotted fabric is unchanged during twelve revolutions of the shaft 50 or six revolutions of the main shaft 54, one row of knots being completed in that time and two picks being thrown during the two following revolutions of the main shaft. It is therefore unnecessary to operate the take-up mechanism except at intervals, and I have shown diagrammatically in Fig. 2—A means for disengaging the pawl 487 from the ratchet during seven rotations of the main shaft, a disc cam element 492 rigid with the shaft 263 being provided having a depression 493; a link 494 is swiveled at one end to the pitman 488, and projecting from the other end is a stud on which is journaled a roll 495 engaging the periphery of the cam element 492, the link being yoked about the shaft 263 to retain operative relation of the roll and cam element.

As the cam element is rotated intermittently, the roll dropping into the depression permits the pawl 487 to engage the ratchet wheel 485 once in eight revolutions of the main shaft, the crank operating to reciprocate the pawl twice before the cam element is rotated to raise the pawl.

In Fig. 8 I have shown a modification of my invention in which I employ a dobby pattern device. In this case the dobby cylinder 500 is rigid with the shaft 501, rotatable in the arms 502, rigid with the shaft 503, journaled in the supports rigid with the frame of the loom on either side.

A cam element 504 operates on an extension 505 of one of the arms 502 to oscillate the cylinder, the links 506 of the dobby chain being provided with pegs 507 of varied lengths, and being connected in the usual manner to form an endless belt supported by a suitable idler not shown.

The pegs on each link are suitably spaced and of the required length to advance plungers 508 slidable in the holder 509 and corresponding in number and relation to each of the yarn fingers 80. The fingers are each provided with a series of steps 510 corresponding with respective yarn channels of the character described.

As the dobby cylinder is oscillated toward the plungers, the pegs abut respective plungers, and the fingers being in raised position the plungers are advanced according to the length of the pegs to engage the step corresponding to the required yarn or to the position of the other fingers of each group to retain them in raised position. As the dobby cylinder is retracted, the plungers are retracted by the action of the springs 511, and a pawl 512 engages a ratchet 513 to rotate the cylinder to present another link, a detent 514 of suitable character engaging notches in a disc rotatable with the cylinder.

The yarns are led through a compart 516 and over a suitable tension device, here indicated by supporting members 517 to which are secured cross bars 517' over and under which the yarns are led to suitable creels or other source of supply not shown.

In Figs. 3 and 3—A I have shown diagrammatically an adaptation of the Axminster spool system as a substitute for yarn finger elements and pattern mechanisms already described, in which the Axminster spools may be operated substantially in the manner now employed with such system. In the drawings a plurality of spools 520 are wound in accordance with a predetermined pattern, with yarns for each knot in each row. The roll for a row of knots is operated in the usual manner of such a system to present the yarn ends 521 in position to be engaged successively by the grippers 172', 173', to draw strands for the several series of knots in the row, the gripper 172' being formed with tongue like ends 522, of a width and suitably spaced to draw the yarn strands for the series of knots, as shown at 523. As the warp shed is changed and the knotting mechanism is moved transversely as described, the tongues engage the succeeding yarn strand wound on the spool as at 524. When the strands have been successively drawn from the roll to form the predetermined number of knots in the row, the roll is replaced by a succeeding roll for the next row of knots, binder picks being supplied between, as already described.

The filler or binder thread may be supplied by throwing a single shuttle from side to side, or a pair of shuttles, may be operated alternately, to supply a heavy and a light pick to produce a fabric in which the lighter pick is beaten up inside the heavier pick, by reason of their respective weights, as shown in Fig. 38, both picks being concealed by the yarn of the formed knots.

In Fig. 34 I have shown a chart on which is diagrammatically shown the approximate relation of the movements of the several members in the production of a single series of knots, the reference characters referring to the actuating elements of the several members.

Considering the cycle as beginning when the lay beam starts to swing backward after beating up; the grippers 172, 173 have drawn a series of yarns, which are engaged by the weaving blocks 161 and clamped by the fingers 232, and severed, and the positions of the members are substantially as shown in Fig. 18. As the lay beam is swung to its backward position, the gripper and weaving block slides move inward together, the weaving blocks entering the shed. The gripper slide being released from the weaving block slide, continues its inward movement, and the clamp fingers are lifted sufficiently to permit the shifting of the weaving blocks, to the contiguous finger, the additional inward movement of the grippers supplying the slack of yarn required for the knot as the shed is changed, the gripper slide engaging with the weaving block slide in the forward socket 203. The clamping fingers again engage the yarn ends and the slides are reciprocated as hereinbefore explained, as the warp shed is changed the clamping fingers then being again lifted and the slides dwelling until the weaving blocks are returned to initial position by the action of the actuating blades, and the blades are in position to again move the weaving blocks to the contiguous fingers for another series of knots. The yarn ends again being clamped, the slides now move outward together ahead of the forward swing of the lay beam, the loose knot being drawn on the warps to the fell where it is tightened, and the ends of the yarn released as the slides are retracted. The gripper slide is released from the weaving block slide, as the latter reaches its extreme backward movement, and the grippers in open position move toward the yarn fingers, the clamp fingers being simultaneously lifted to permit passage of the grippers to engage another series of yarns. During the interval in which the foregoing operations have been performed, the indicator card has been moved to control the yarns to be used for the succeeding series of knots, and when so moved the beam has engaged the card, and the lifter wires are oprated. The lock bar is operated and the yarn fingers are permitted to drop to engage the abutments on the abutment slides. The grippers moved inward to engage the yarns, are released to grip, and as the yarn is drawn out, the clamp fingers guide respective yarn strands into the weaving blocks and clamp the strands as the grippers are retracted to their outer limit of movement. The shear holder is moved down as the grippers are retracted and as they approach the extreme outward limit, the shear blades are operated to sever the drawn out yarns. The cycle is now complete.

Returning to the preferred form of pattern device, as the length of the cards would be excessive if extended across the loom, I provide a plurality of cards 402, 402', 403'', etc., operated by separate conveyors and sprockets 406 secured to the shaft 408, the perforations in the compart 451' Fig. 29 being so disposed that they may be guided to indicator means of the character described.

Having thus described my invention, I claim:—

1. In a loom, means for holding the warp threads; a plurality of yarn supporting fingers arranged in a plurality of groups spaced at intervals transversely across the loom, each finger being formed to guide a plurality of yarn strands; means for operating the fingers of the different groups in different orders; weaving mechanism including a plurality of weaving blocks, equal in number and in operative relation to the finger groups; means for engaging a yarn strand from each group of fingers with its respective weaving block; means for moving the weaving blocks to weave transversely of said warp threads; and means for completing the transverse weaving intermittently progressive.

2. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; and means including a positive mover, for reciprocating the weaving blocks in unison to weave transversely of the respective warp threads; and means for completing the transverse weaving intermittently progressive.

3. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; and means including a positive mover, for reciprocating the weaving blocks in unison to weave transversely of the respective warp threads, to form thereabout a series of knots spaced transversely of the loom; and means for completing the transverse weaving intermittently progressive.

4. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; means for severing the respective strands from the supply when thus engaged; and means including a positive mover, for reciprocating the weaving blocks in unison to weave transversely of the respective warp threads; and means for completing the transverse weaving intermittently progressive.

5. In a loom, means for holding the warp threads; a plurality of yarn supporting fingers arranged in a plurality of groups, spaced at intervals side by side across the loom, each finger being formed to guide and support a plurality of yarn strands; weaving mechanism including a plurality of weaving blocks equal in number and respectively in operative relation to the finger groups; a carrier in which the weaving blocks are transversely movable; means for independently controlling the fingers to supply a single strand of yarn from each group to engage the respective weaving block; means for engaging the presented strands with the respective weaving blocks; and means including a positive mover, for reciprocating the weaving blocks in unison, to weave transversely of the warp threads; and means for completing the transverse weaving intermittently progressive.

6. In a loom, means for holding the warp threads; a plurality of yarn supporting fingers arranged in a plurality of groups, spaced at intervals side by side across the loom, each finger being formed to guide and support a plurality of yarn strands; weaving mechanism including a plurality of weaving blocks, equal in number and respectively in operative relation to the finger groups; a carrier in which the weaving blocks are transversely movable; means for independently controlling the fingers to supply a single strand of yarn from each group to engage the respective weaving block; gripper members; means for operating the gripper members to engage the presented yarn strands and to draw each from the respective finger; means for engaging the yarn strands with respective weaving blocks; means for severing the strands when so drawn from their supply, to provide independent sections of yarn, each held near its respective ends in a weaving block and by gripper members; and means including a positive mover, for reciprocating the weaving blocks in unison, to weave transversely of the warp threads, and means for completing the transverse weaving intermittently progressive.

7. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving blocks; means for engaging the presented strands with the respective weaving blocks; means for severing the strands when so engaged; means for reciprocating the weaving blocks to make a single complete line of weaving with a plurality of back and forth movements of all the weaving blocks; beating up mechanism, and shedding mechanism, the aforesaid mechanisms being timed and arranged to give each weaving block at least one complete weaving movement between consecutive beating up movements.

8. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving blocks; means for engaging the presented strands with the respective weaving blocks; means for severing the strands when so engaged; means for retaining one end of each strand in respective weaving blocks; means for reciprocating the weaving blocks to make a single complete line of weaving with a plurality of back and forth movements of all the weaving blocks; beating up mechanism, and shedding mechanism, the aforesaid mechanisms being timed and arranged to give each weaving block at least one complete weaving movement between consecutive beating up movements.

9. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; means for reciprocating said weaving blocks in weaving relation to the warp threads, and means for varying the positions of the weaving blocks transversely relative to the fingers in a group on a succeeding reciprocating operation of the weaving blocks.

10. In a loom, means for holding the warp threads; a plurality of separate groups of yarn supporting fingers, spaced at intervals side by side across the loom, each finger being formed to guide a plurality of yarn strands; weaving mechanism including a weaving block in operative relation to each finger group to weave a section of fabric across the loom; means for controlling the fingers of each group to supply a single yarn strand to engage the weaving block; means for selecting a particular yarn strand presented by a selected finger; means for engaging said strand with the respective weaving block; and mechanism for operating the weaving blocks to weave transversely across the fabric in each of the sections, with any yarn selected as desired from the group of fingers of the given section.

11. In a loom, means for holding the warp threads; a plurality of yarn supporting fingers arranged in a plurality of groups spaced at intervals across the loom, each finger being formed to guide a plurality of yarn strands, and each finger having a selective movement independent of all the other fingers; weaving mechanism including pattern mechanism; shedding mechanism having a predetermined unvarying order of warp thread lifting for a given number of warp threads in a group section, irrespective of variations of pattern; a plurality of weaving blocks in operative relation with respective groups of fingers; means for engaging a selected yarn strand from any finger of a group with its respective weaving block; means for reciprocating the said weaving blocks in weaving relation to the warp threads; means for advancing the weaving movement of the weaving blocks intermittently progressive across the loom for one transverse row of weaving; means responsive to said pattern mechanism to give said fingers their separate independent selective movements, for varying the relative positions of said fingers on successive steps of said intermittently progressive weaving movements; and means for laying filler or binder thread, operative only after a complete transverse row of said weaving has taken place.

12. In a loom, means for holding the warp threads; a plurality of multicolor yarn supplying elements arranged in a plurality of groups spaced at intervals transversely across the loom; weaving mechanism including weaving blocks in operative relation with respective groups of yarn supplying elements, means for engaging a strand of yarn therefrom with each weaving block, means for operating the blocks in weaving relation with the warp threads, to simultaneously weave a corresponding plurality of sections transversely across the loom; and means for independently varying and selecting each color independently of all other colors in said different groups, to be woven in any one of said transverse weaving movements.

13. In a loom, means for holding the warp threads; a plurality of yarn supporting elements arranged in a plurality of groups transversely across the loom; weaving mechanism including weaving blocks in operative relation with respective groups of yarn supporting elements; means for engaging a strand of yarn therefrom with each weaving block; means for severing a section of yarn from each supply when so engaged; means for retaining the severed end in the weaving block; and means for operating the weaving blocks to coil the yarn sections in a series of independent oriental knots around said warp threads, across the fabric.

14. In a loom of the character described in claim 10, pattern shedding mechanism for shedding the warp threads to cooperate with the action of the weaving blocks; binder weft shuttle mechanism, and binder shedding mechanism therefor.

15. In a loom of the character described in claim 10, pattern shedding mechanism for shedding the warp threads to cooperate with the action of the weaving blocks; binder weft shuttle mechanism, and shedding mechanism therefor; and operating mechanism for said shuttle mechanism to lay a binder thread only after the completion of a row of knots across the loom; and means for beating up to the fell each series of knots and each pick of binder thread.

16. In a loom, means for holding the warp threads; warp shedding mechanism; a plurality of groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group with the grippers; means for selecting such strands; means for operating the grippers to engage the said ends of yarn strands and draw them from the fingers; means for engaging the strands with respective weaving blocks; means for severing a predetermined length from each yarn strand when so engaged; means engaging the yarn strands near their severed ends to retain them engaged with the weaving blocks; means for coiling the strands about the respective segregated groups of warp threads to form oriental knots, the severed strand being held near the respective ends by the grippers and in the weaving blocks as the knot is drawn tight and before releasing the ends; means for operating the weaving mechanism in intermittent progression across the loom to complete a row of knots; and means for laying filler or binder thread, operative only after a complete row of knots has been made.

17. In a loom, means for holding the warp threads; warp shedding mechanism; a plurality of groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group with the grippers; means for selecting such strands; means for operating the grippers to engage the said ends of yarn strands and draw them from the fingers; means for engaging the yarn strands with respective weaving blocks; means for severing a predetermined length from each yarn strand when so engaged; means for clamping the yarn strands to retain them in engagement with the weaving blocks; means for coiling the strands about the respective segregated groups of warp threads to form oriental knots, the severed strands being held near the respective ends by the grippers and in the weaving blocks as the knot is drawn tight before releasing the ends; means for operating the weaving mechanism in intermittent progression across the loom to complete a row of knots; and means operative only after a complete row of knots is formed for supplying an excess length of filler or binder thread to provide for crimping action of the warp threads thereon; such means operating in periodic agreement with the separate and unvaried beating action of the lay on the several series of knots, and the picks of filler or binder thread.

18. In a loom, means for holding the warp threads; warp shedding mechanism; a plurality of fingers arranged in a plurality of groups spaced at intervals, transversely across the loom, each finger being formed to guide a plurality of yarn strands; means for operating the fingers of the different groups in different orders; weaving mechanism including a plurality of weaving blocks, equal in number and in respective relation to the finger groups; a carrier member therefor; means for engaging a yarn strand from each group of fingers with its respective weaving block; a member movable relative to the carrier member, and adapted to engage the weaving blocks; means for operating said member to move the weaving blocks to weave transversely of the said warp threads; and means for completing the transverse weaving progressively step by step.

19. In a loom, means for holding the warp threads; warp shedding mechanism; a plurality of fingers arranged in a plurality of groups spaced at intervals, transversely across the loom, each finger being formed to guide a plurality of yarn strands; means for operating the fingers of the different groups in different orders; weaving mechanism including a plurality of weaving blocks, equal in number and in respective relation to the finger groups; a carrier member with which the weaving blocks are slidably engaged; a support therefor; means for engaging a yarn strand from each group of fingers with its respective weaving block; a member slidably supported by the carrier and adapted to engage the weaving blocks; means for operating said member to reciprocate the weaving blocks; cooperative warp shedding mechanism coordinated to coil the yarn strands about respective pairs of warp threads to form a spaced series of oriental knots across the loom; and means for completing a transverse row of knots progressively step by step.

20. In a loom, means for holding the warp threads; warp shedding mechanism; a plurality of separate groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group, with the grippers; means for selecting such strands; a gripper carrier; a support in which the carrier is slidable longitudinally relative to the fingers and the weaving blocks; means for operating the grippers; means for reciprocating the carrier to engage the grippers with the ends of the selected yarn strands, and to draw them from the fingers; means for engaging the strands with the respective weaving blocks; means for coiling the strands about respective segregated groups of warp threads to form oriental knots, the severed strands being held near the respective ends by the grippers and in the weaving blocks; means for clamping the severed ends to retain them engaged with the weaving blocks as the knot is drawn tight before releasing the ends; a carrier member with which the weaving blocks are slidably engaged; a support therefor; a member slidably supported by the carrier and adapted to engage the weaving blocks; means for operating the said member to reciprocate the weaving blocks in coordination with warp shedding mechanism to coil the yarn strands about respective segregated groups of warp threads to form a spaced series of oriental knots across the loom, such means including a cam element adapted to engage the slidably supported member; and means for operating the cam element; and means for completing a transverse row of knots in intermittent progression, across the loom; such means including a carriage slidable transversely of the loom and to which the support for the gripper carrier, and the weaving block carrier is secured; cam elements operative to move the carriage transversely and progressively to cooperate with the knot forming mechanism to form oriental knots about successive pairs of warp threads; a shaft to which the cam elements are secured; a ratchet secured to the shaft; operative connections between the ratchet and the main shaft of the loom, by means of which the shaft and cam elements are rotated step by step in equal arcs, to move the carriage and supported parts to accord with the several series of knots.

21. In a loom, means for holding the warp threads; warp shedding mechanism; a plurality of fingers arranged in a plurality of groups spaced at intervals side by side, above and in advance of the fell, and transversely across the loom; each finger being formed to guide a plurality of yarn strands; weaving mechanism including a plurality of weaving blocks equal in number and respectively in operative relation to the finger groups; means for controlling the fingers to supply a single strand of yarn from each group to engage the respective weaving blocks; means movable to engage the presented yarn strands and draw each from its finger; means operative to engage the strands with respective weaving blocks; means for severing the strands when so drawn from their supply to provide independent sections of yarn; means for moving the weaving blocks and yarn sections into the warp shed in weaving relation therewith; and means for reciprocating the weaving blocks in unison, to weave transversely of the warp threads, to form a series of independent knots thereabout; and means for completing the weaving, in intermittent progression to form a complete row of independent knots about respective segregated groups of warp threads across the loom.

22. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom, in combination therewith, groups of independently movable yarn supporting fingers equal in number to the weaving blocks and respectively in operative relation thereto; means for moving the fingers; means operatively connected with the pattern mechanism for selecting a particular strand from each group of fingers to be woven by each complete operation of the weaving blocks; and means for completing the transverse weaving, intermittently and progressively.

23. In a loom having means for holding the warp threads, mechanism for weaving transversely of the warp threads, and a plurality of yarn supporting fingers arranged side by side transversely of the loom, each finger being formed to guide a plurality of yarn strands, and being independently movable in a path of movement common to the several strands, and means for moving the fingers to a common maximum limit; in combination therewith means for limiting the reverse movement of each finger independently, to supply a selected yarn strand in a finger or group of fingers to the weaving mechanism.

24. In a loom of the character described in claim 23, in combination therewith, pattern mechanism and means selectively controlled thereby, for limiting the reverse movement of each finger independently, to supply a particular yarn strand in a finger or group of fingers to the weaving mechanism.

25. In a loom of the character described in claim 23, in combination therewith, pattern mechanism; abutments movable in operative relation to respective fingers, and controlled in operation by the pattern mechanism to engage corresponding fingers to selectively limit the reverse movement of such fingers to supply a particular yarn strand in a finger or group of fingers to the weaving mechanism; and means for retaining all fingers in set position to supply the selected strands simultaneously to the weaving mechanism to weave across the loom; and means for varying the selection of strands with each weaving operation.

26. In a loom of the character described in claim 23, in combination therewith, pattern mechanism including a plurality of series of lifting wires extending transversely of the loom, said lifting wires having hooked ends; a grid, including a lifting knife movable in a fixed path to engage the hooks of each series of lifting wires for pattern weaving, the hooks of each series varying in normal relation to the respective knives to vary the degree of movement of the lifting wires to correspond with the spacing of the several yarn strands in each finger; indicator wires, axially movable transversely of the lifter wires, each provided with an eye for guiding its lifter wire; springs normally holding the indicator wires to yieldingly retain the hooks of the lifting wires normally in the paths of the respective grid knives; a pattern device including perforated pattern cards, movable intermittently, normal to the axes of the indicator wires, and adapted to be oscillated to permit the passage of indicator wires aligned with certain perforations according to the pattern and to depress all other indicator wires to remove the hooks on corresponding lifting wires from respective paths of the grid knives; abutments movable in operative relation to respective fingers, and adapted to engage therewith; connections from each abutment with corresponding lifting wires in each series, whereby the abutment will be lifted by the lifting wire indicated and the return movement of the finger limited to supply a selected yarn strand in a finger or group of fingers to the weaving mechanism.

27. In a loom of the character described in claim 23, in combination therewith, pattern mechanism including a plurality of series of lifting wires extending transversely of the loom, said lifting wires having hooked ends; a grid, including a lifting knife movable in a fixed path to engage the hooks of each series of lifting wires for pattern weaving, the hooks of each series varying in normal relation to the respective knives to vary the degree of movement of the lifting wires to correspond with the spacing of the several yarn strands in each finger; indicator wires, axially movable transversely of the lifter wires, each provided with an eye for guiding its lifter wire; springs normally holding the indicator wires to yieldingly retain the hooks of the lifting wires normally in the paths of the respective grid knives; a pattern device including perforated pattern cards to govern the selection of yarn strands for a complete row of knots, the cards being movable intermittently, normal to the axes of the indicator wires to present successive groups of perforations in alignment with said wires, to govern the selection of yarn strands for the several series of knots in the row, and adapted to be oscillated to permit the passage of indicator wires aligned with certain perforations according to the pattern and to depress all other indicator wires to remove the hooks on corresponding lifting wires from respective paths of the grid knives; abutments movable in operative relation to respective fingers, and adapted to engage therewith; connections from each abutment with corresponding lifting wires in each series, whereby the abutment will be lifted by the lifting wire indicated and the return movement of the finger limited to supply a selected yarn strand in a finger or group of fingers to the weaving mechanism.

28. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom, in combination therewith, groups of independent movable yarn fingers equal in number to the weaving blocks and respectively in operative relation thereto; means for moving the fingers; means operatively connected with the pattern mechanism for selecting a particular strand from each group of fingers to be woven by each complete operation of the weaving blocks; and means for completing the transverse weaving, intermittently and progressively; and means coordinated with the weaving mechanism for changing the order of selection between each weaving operation; and coordinated means for interrupting the operation of the weaving mechanism and the pattern mechanism simultaneously to permit binder shedding operation after each transverse line of weaving is completed.

29. In a loom of the character described in claim 22, a cam shaft; means for rotating the shaft through a complete revolution by fractional steps; cam elements rotatable with the shaft and respectively operating to move the carriage intermittently transversely of the loom; to operate means for supplying excess length of binder; to operate means for interrupting the functioning of the weaving mechanism; to operate means for interrupting the operation of the pattern mechanism; to operate means for interrupting the operation of the yarn supporting fingers; and to control the take up of the finished web, the action of the several cams cooperating to weave sectionally step by step to complete a transverse line of weaving, and the shedding of binder filler thereafter, and the continuous repetition of such operations.

30. In a loom, means for holding the warp threads; a plurality of yarn supporting fingers arranged in a plurality of groups spaced at intervals transversely across the loom, each finger being formed to guide a plurality of yarn strands; means for operating the fingers of the different groups in different orders; weaving mechanism including a plurality of weaving blocks, equal in number and in operative relation to the finger groups; means for engaging a selected yarn strand from each group of fingers with its respective weaving block; means for moving and weaving blocks to weave transversely of said warp threads; and means for completing the transverse weaving intermittently progressive.

31. In a loom, means for holding the warp threads; a plurality of yarn supporting fingers arranged in a plurality of groups spaced at intervals transversely across the loom, each finger being formed to guide a plurality of yarn strands; means for operating the fingers of the different groups in different selective orders; weaving mechanism including a plurality of weaving blocks, equal in number and in operative relation to the finger groups; means for engaging a selected yarn strand from each group of fingers with its respective weaving block; means for moving the weaving blocks to weave transversely of said warp threads; and means for completing the transverse weaving intermittently progressive.

32. In a loom, means for holding the warp threads; a plurality of yarn supporting fingers arranged in a plurality of groups spaced at intervals transversely across the loom, each finger being formed to guide a plurality of yarn strands; means for operating the fingers of the different groups in different orders; weaving mechanism including a plurality of weaving blocks, equal in number and in operative relation to the finger groups; means for engaging a yarn strand from each group of fingers with its respective weaving block; means for moving the weaving blocks laterally to weave transversely of said warp threads; and means for completing the transverse weaving intermittently progressive.

33. In a loom, means for holding the warp threads; a plurality of yarn supporting fingers arranged in a plurality of groups spaced at intervals transversely across the loom, each finger being formed to guide a plurality of yarn strands; means for operating the fingers of the different groups in different orders; weaving mechanism including a plurality of weaving blocks, equal in number and in operative relation to the finger groups; means for engaging a yarn strand from each group of fingers with its respective weaving block; means for moving the weaving blocks to weave knots transversely of said warp threads; and means for completing the transverse weaving intermittently progressive to form a row of uniform knots.

34. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block, and to retain the other fingers of the group inoperative during the weaving operation; and means including a positive mover, for reciprocating the weaving blocks in unison to weave transversely of the respective warp threads; and means for completing the transverse weaving intermittently progressive.

35. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; and means including a positive mover, for reciprocating the weaving blocks in unison to weave transversely of the respective warp threads to form thereabout a series of knots spaced transversely of the loom; and means for completing the transverse weaving intermittently progressive to form a row of uniform knots.

36. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups, pattern mechanism by means of which the fingers may be controlled, to present a particular yarn strand from any finger in each group, to engage the respective weaving block; means for engaging the presented strands with the respective weaving blocks; and means including a positive mover, for reciprocating the weaving blocks in unison to weave transversely of the respective warp threads; and means for completing the transverse weaving intermittently progressive.

37. In a loom, means for holding the warp threads; a plurality of yarn supporting fingers arranged in a plurality of groups spaced at intervals side by side across the loom, each finger being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; means for simultaneously severing the respective strands from the supply when thus engaged; and means including a positive mover, for reciprocating the weaving blocks in unison to weave transversely of the respective warp threads; and means for completing the transverse weaving intermittently progressive.

38. In a loom, means for holding the warp threads; a plurality of yarn supporting fingers arranged in a plurality of groups, spaced at intervals side by side across the loom, each finger being formed to guide and support a plurality of yarn strands; weaving mechanism including a plurality of weaving blocks, equal in number and respectively in operative relation to the finger groups; a carrier in which the weaving blocks are transversely movable; means for independently controlling the fingers to supply a single strand of yarn from each group to engage the respective weaving block; means movable to engage the presented yarn strands and draw each to engage with the respective weaving block; and means including a positive mover, for reciprocating the weaving blocks in unison, to weave transversely of the warp threads, and means for completing the transverse weaving intermittently progressive.

39. In a loom, means for holding the warp threads; a plurality of yarn supporting fingers arranged in a plurality of groups, spaced at intervals side by side across the loom, each finger being formed to guide and support a plurality of yarn strands; weaving mechanism including a plurality of weaving blocks, equal in number and respectively in operative relation to the finger groups; a carrier in which the weaving blocks are transversely movable; means for independently controlling the fingers to supply a single strand of yarn from each group to engage the respective weaving block; gripper members common to all yarn strands; means for operating the gripper members to engage the presented yarn strands and to draw each from the respective finger; means for engaging the yarn strands with respective weaving blocks; means for severing the strands when so drawn from their supply, to provide independent sections of yarn, each held near its respective ends in a weaving block and by gripper members; and means including a positive mover, for reciprocating the weaving blocks in unison, to weave transversely of the warp threads, and means for completing the transverse weaving intermittently progressive.

40. In a loom, means for holding the warp threads; a plurality of yarn supporting fingers arranged in a plurality of groups spaced at intervals side by side across the loom, each fingers being formed to guide a plurality of yarn strands; weaving mechanism including a plurality of weaving blocks equal in number and in respective relation to the finger groups; means for independently controlling the fingers to supply a single strand of yarn from each group to engage the respective weaving block; means for engaging the presented strands with the respective weaving blocks; means for reciprocating said weaving blocks in weaving relation to the warp threads, and means for varying the positions of the weaving blocks relative to the fingers in a group, in a transverse direction on a succeeding movement of the weaving blocks operated on a preceding weaving movement, intermittently progressive to weave a continuous line across the loom.

41. In a loom, means for holding the warp threads; a plurality of separate groups of fingers, spaced at intervals side by side across the loom, each finger being formed to guide a plurality of yarn strands; weaving mechanism including a weaving block in operative relation to each finger group to weave a section of fabric across the loom; means for controlling the fingers of each group to supply a single yarn strand to engage the weaving block; means for selecting a particular yarn strand presented by a selected finger; means for engaging said strand with the respective weaving block; and mechanism for operating the weaving blocks to weave transversely across the fabric in each of the sections, with any yarn selected as desired from the group of fingers of the given section, to complete a line across the loom; and means for returning the weaving blocks to initial position to repeat the sectional weaving.

42. In a loom, means for holding the warp threads; a plurality of multicolor yarn supplying elements arranged in a plurality of groups spaced at intervals transversely across the loom; weaving mechanism including weaving blocks in operative relation with respective groups of yarn supplying elements, means for engaging a strand of yarn therefrom with each weaving block, means for operating the weaving blocks to simultaneously weave a corresponding plurality of sections transversely across the loom; and cooperative selective means for varying and selecting each color independently of all other colors to be woven.

43. In a loom, means for holding the warp threads; a plurality of multicolor yarn supplying elements arranged in a plurality of groups spaced at intervals transversely across the loom; weaving mechanism including weaving blocks in operative relation with respective groups of yarn supplying elements, means for engaging a strand of yarn therefrom with each weaving block; means for operating the weaving blocks to weave step by step simultaneously at intervals, a continuous line of multicolor weaving across the loom; and cooperative selective means to select each color in said line of weaving independently of the other colors of said line.

44. In a loom, means for holding the warp threads; a plurality of yarn supporting elements arranged in a plurality of groups transversely across the loom; weaving mechanism including weaving blocks in operative relation with respective groups of yarn supporting elements; means for engaging a strand of yarn therefrom with each weaving block; means for severing a section of yarn from each supply when so engaged; means for retaining the severed end in the weaving block; and means operating the weaving blocks to simultaneously coil the yarn sections in a series of independent oriental knots around said warp threads, across the fabric.

45. In a loom, means for holding the warp threads; a plurality of yarn supporting elements arranged in a plurality of groups transversely across the loom; weaving mechanism including weaving blocks in operative relation with respective groups of yarn supporting elements; means for engaging a strand of yarn therefrom with each weaving block; means for severing a section of yarn from each supply when so engaged; means for retaining the severed end in the weaving block; and means operating the weaving blocks to simultaneously coil the yarn sections in a series of independent oriental knots around said warp threads spaced transversely across the fabric; and means for forming other series to complete a compact line of pile knots.

46. In a loom of the character described in claim 17, pattern shedding mechanism for shedding the warp threads to cooperate with the action of the weaving blocks; binder weft shuttle mechanism, and binder shedding mechanism therefor; and operating mechanism for said shuttle mechanism to lay binder weft threads only after the completion of a row of knots across the loom.

47. In a loom having means for holding warp threads, warp shedding mechanism; a plurality of yarn supplying elements, each formed to support a plurality of yarn strands, and arranged above and in advance of the fell and transversely across the loom, and means controlling the elements for the purpose of moving selected yarn strands into operative position, weaving mechanism operative to engage selected yarn strands, to sever the strands when so engaged, to provide independent sections; and to move them longitudinally relative to and into the warp shed in weaving relation therewith, and to weave respective yarn strands about corresponding warp threads.

48. In a loom having means for holding warp threads, warp shedding mechanism and a plurality of yarn supplying elements arranged above and in advance of the fell, and transversely across the loom, and means for controlling the elements to move selected yarn strands into operative position, weaving mechanism including a plurality of weaving blocks in operative relation to the yarn supplying elements; means for engaging the selected yarn strands to draw them into engagement with respective weaving blocks; means for severing said strands when so engaged to provide independent sections; means for moving the weaving blocks and yarn sections longitudinally relative to and into the warp shed in weaving relation therewith; and means for reciprocating the weaving blocks to weave transversely of the warp threads.

49. In a loom having means for holding warp threads, warp shedding mechanism and a plurality of yarn supplying elements arranged above and in advance of the fell, and transversely across the loom, and means for controlling the elements to move selected yarn strands into operative position, weaving mechanism including a plurality of weaving blocks in operative relation to the yarn supplying elements; means for engaging the selected yarn strands to draw them into engagement with respective weaving blocks; means for severing said strands when so engaged to provide independent sections; means for moving the weaving blocks and yarn sections longitudinally relative to and into the warp shed in weaving relation therewith; and means for reciprocating the weaving blocks to weave transversely of the warp threads to form independent knots thereabout.

50. In a loom having means for holding warp threads, warp shedding mechanism and a plurality of yarn supplying elements arranged above and in advance of the fell, and transversely across the loom, and means for controlling the elements to move selected yarn strands into operative position, weaving mechanism including a plurality of weaving blocks in operative relation to the yarn supplying elements; means for engaging the selected yarn strands to draw them into engagement with respective weaving blocks; means for severing said strands when so engaged to provide independent sections, held near each end; means for moving the weaving blocks and yarn sections while so held, longitudinally relative to and into the warp shed in weaving relation therewith; and means for reciprocating the weaving blocks to weave transversely of the warp threads.

51. In a loom having means for holding warp threads, warp shedding mechanism, and a plurality of yarn supplying elements arranged in a plurality of groups above and in advance of the fell and transversely across the loom and means for controlling the elements to move a single strand of yarn from each group into operative position; weaving mechanism, including a plurality of weaving blocks equal in number and respectively in operative relation to the groups of yarn supplying elements; means for engaging the presented yarn strands to draw each from its element to engage the respective weaving block; means for severing said strands when so engaged to provide independent sections; means for moving the weaving blocks and yarn sections longitudinally relative to and into the warp shed in weaving relation therewith; and means for reciprocating the weaving blocks in unison to weave transversely of the warp threads.

52. In a loom having means for holding warp threads, warp shedding mechanism, and a plurality of yarn supplying elements arranged in a plurality of groups above and in advance of the fell and transversely across the loom and means for controlling the elements to move a single strand of yarn from each group into operative position; weaving mechanism, including a plurality of weaving blocks equal in number and respectively in operative relation to the groups of yarn supplying elements; means for engaging the presented yarn strands to draw each from its element to engage the respective weaving block; means for severing said strands when so engaged to provide independent sections; means for moving the weaving blocks and yarn sections longitudinally relative to and into the warp shed in weaving relation therewith; and means for reciprocating the weaving blocks in unison to weave transversely of the warp threads to form a series of independent knots thereabout.

53. In a loom having means for holding warp threads, warp shedding mechanism; and a plurality of yarn supplying elements arranged in a plurality of groups above and in advance of the fell and transversely across the loom and means for controlling the elements to move a single strand of yarn from each group into operative position, weaving mechanism including a plurality of weaving blocks equal in number and respectively in operative relation to the groups of yarn supplying elements; means for engaging the presented yarn strands and to draw each from its element to engage the respective weaving block; means for severing said strands when so engaged to provide independent sections; means for moving the weaving blocks and yarn sections longitudinally relative to and into the warp shed in weaving relation therewith; and means for reciprocating the weaving blocks to weave transversely of the warp threads to form a series of independent knots; and means for completing the weaving, in intermittent progression to form a complete row of independent knots about respective segregated groups of warp threads across the loom.

54. In a loom having means for holding warp threads, warp shedding mechanism, a lay and operating means therefor, and a plurality of yarn supplying elements arranged above and in advance of the fell, and transversely across the loom, and means for controlling the elements to move selected yarn strands into operative position, weaving mechanism including a plurality of weaving blocks in operative relation to the yarn supplying elements; and supported independently thereof and of the lay; means for engaging the selected yarn strands to draw them into engagement with respective weaving blocks; means for severing said strands when so engaged to provide independent sections; means for moving the weaving blocks and yarn sections longitudinally relative to and into the warp shed in weaving relation thereto; and means for reciprocating the weaving blocks to weave transversely of the warp threads.

55. In a loom having means for holding warp threads, warp shedding mechanism, a lay, means for operating the lay to beat up to the fell, a plurality of yarn supplying elements arranged above and in advance of the fell and transversely across the loom, and means controlling the elements to move selected yarn strands into operative position, weaving mechanism operative to engage the strands thus presented to move them as the lay recedes from the fell, longitudinally relative to and into the warp shed, and into weaving relation with the warp threads, and thereafter to weave respective strands about corresponding warp threads.

56. In a loom having means for holding warp threads, warp shedding mechanism, a lay, means for operating the lay to beat up to the fell, a plurality of yarn supplying elements arranged above and in advance of the fell and transversely across the loom and means controlling the elements to move selected yarn strands into operative position, weaving mechanism operative to engage the strands thus presented to move them as the lay recedes from the fell, longitudinally relative to and into the warp shed, and into weaving relation with the warp threads, and thereafter to weave respective strands about corresponding warp threads before the succeeding beat of the lay.

57. In a loom, means for holding the warp threads; warp shedding mechanism; a plurality of groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group with the grippers; means for selecting such strands; means for operating the grippers to engage the said ends of yarn strands and draw them to engage respective weaving blocks; means for severing a predetermined length from each yarn strand when so engaged, near the severed end; means for coiling the strands about the respective segregated groups of warp threads to form oriental knots, the severed strand being held near the respective ends by the grippers and the weaving blocks as the knot is drawn tight before releasing the ends; and means for operating the weaving mechanism in intermittent progression across the loom to complete a row of knots; and means operative only after a complete row of knots is formed for supplying an excess length of filler or binder thread to provide for crimping action of the warp threads thereon.

58. In a loom, means for holding the warp threads; warp shedding mechanism; a plurality of groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group with the grippers; means for selecting such strands; means for operating the grippers to engage the said ends of yarn strands and draw them from the fingers; means for engaging the yarn strands with respective weaving blocks; means for severing a predetermined length from each yarn strand when so engaged and retained thereby; means for clamping the yarn strands to retain them in engagement with the weaving blocks; means for coiling the strands about the respective segregated groups of warp threads to form oriental knots, the severed strands being held near the respective ends by the grippers and in the weaving blocks as the knot is drawn tight before releasing the ends; means for operating the weaving mechanism in intermittent progression across the loom to complete a row of knots; and means for laying filler or binder thread, operative only after a complete row of knots has been made; means for operating the lay to beat up each series of knots and each pick of the binder, in periodic relation to successive unvaried warp shedding; and means operative only after a complete row of knots is formed, for supplying an excess length of filler or binder thread to provide for crimping action of the warp threads thereon.

59. In a loom, means for holding the warp threads; warp shedding mechanism; a plurality of groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group with the grippers; means for selecting such strands; means for operating the grippers to engage the said ends of yarn strands and draw them to engage respective weaving blocks; means for severing a predetermined length from each yarn strand when so engaged and held thereby yieldingly; near the severed end: means for coiling the strands about the respective segregated groups of warp threads to form oriental knots, the severed strand being held near the respective ends by the grippers and the weaving blocks and the knot drawn tight before releasing the ends; and means for operating the weaving mechanism in intermittent progression across the loom to complete a row of knots; and means for laying filler or binder thread, operative only after a complete row of knots has been made; means for operating the lay to beat up each series of knots and each pick of the binder, in periodic relation to successive unvaried warp shedding; and means operative only after a complete row of knots is formed, for supplying an excess length of filler or binder thread to provide for crimping action of the warp threads thereon; such means operating in periodic agreement with the unvaried beating action of the lay.

60. In a loom, means for holding the warp threads; warp shedding mechanism; a plurality of fingers arranged in a plurality of groups spaced at intervals, transversely across the loom, each finger being formed to guide a plurality of yarn strands; means for operating the fingers of the different groups in different orders; weaving mechanism including a plurality of weaving blocks, equal in number and in respective relation to the finger groups; a carrier member with which the weaving blocks are slidably engaged; a support therefor; means for engaging a yarn strand from each group of fingers with its respective weaving block; a member slidably supported by the carrier and adapted to engage the weaving blocks; means for operating said member to move the weaving blocks slidably in the carrier to weave transversely of the said warp threads; and means for completing the transverse weaving progressively step by step.

61. In a loom, means for holding the warp threads; warp shedding mechanism; a plurality of fingers arranged in a plurality of groups spaced at intervals, transversely across the loom, each finger being formed to guide a plurality of yarn strands; means for operating the fingers of the different groups in different orders; weaving mechanism including a plurality of weaving blocks, equal in number and in respective relation to the finger groups; a carrier member with which the weaving blocks are slidably engaged; a support therefor; means for engaging a yarn strand from each group of yarn fingers with its respective weaving block; a member slidably supported by the carrier and adapted to engage the weaving blocks; means for operating said member to reciprocate the weaving blocks in coordination with the operation of the warp shedding mechanism to coil the yarn strands about respective pairs of warp threads to form a spaced series of oriental knots across the loom; such means including a cam element adapted to engage the slidably supported member; and means for operating the cam element; and means for completing a transverse row of knots progressively step by step.

62. In a loom, means for holding the warp threads; warp shedding mechanism; a plurality of separate groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group, with the grippers; means for selecting such strands; a gripper carrier; a support in which the carrier is slidable longitudinally relative to the fingers and the weaving blocks; means for operating the grippers; means for reciprocating the carrier to engage the grippers with the ends of the selected yarn strands in the fingers, and to draw them into engagement with the respective weaving blocks; means for coiling the strands about respective segregated groups of warp threads; to form oriental knots, the severed strands being held near the respective ends by the grippers and weaving blocks and the knot drawn tight before releasing the ends; a carrier member with which the weaving blocks are slidably engaged; a support therefor; a member slidably supported by the carrier and adapted to engage the weaving blocks; means for operating the said member to reciprocate the weaving blocks in coordination with warp shedding mechanism to coil the yarn strands about respective segregated groups of warp threads to form a spaced series of oriental knots across the loom, such means including a cam element adapted to engage the slidably supported member; and means for operating the cam element; and means for completing a transverse row of knots in intermittent progression, across the loom; such means including a carriage slidable transversely of the loom and to which the support for the gripper carrier, and the weaving block carrier is secured; cam elements operative to move the carriage transversely and progressively to cooperate with the knot forming mechanism to form oriental knots about successive pairs of warp threads; a shaft to which the cam elements are secured; a ratchet secured to the shaft; operative connections between the ratchet and the main shaft of the loom, by means of which the shaft and cam elements are rotated step by step in equal arcs, to move the carriage and supported parts to accord with the several series of knots; and to permit the carriage to rest in initial position while the binder filling picks are shot.

63. In a loom, means for holding the warp threads; warp shedding mechanism; a plurality of fingers arranged in a plurality of groups spaced at intervals side by side, above and in advance of the fell, and transversely across the loom; each finger being formed to guide a plurality of yarn strands; weaving mechanism including a plurality of weaving blocks equal in number and respectively in operative relation to the finger groups; means for controlling the fingers to supply a single strand of yarn from each group to engage the respective weaving block; means movable to engage the presented yarn strands and draw each to engage the respective weaving blocks; means for severing the strands when so drawn from their supply to provide independent sections of yarn; means for moving the weaving blocks and yarn sections into the warp shed in weaving relation therewith; and means for reciprocating the weaving blocks in unison, to weave transversely of the warp threads, to form a series of independent knots thereabout; and means for completing the weaving, in intermittent progression to form a complete row of independent knots about respective segregated groups of warp threads across the loom; weft shedding mechanism; and means for interrupting the operation of the knot forming mechanism only after a row of knots is formed to permit the laying of weft threads.

64. In a loom having means for holding warp threads, warp shedding mechanism, yarn supplying means arranged above and in advance of the fell and transversely across the loom, and means for selecting and moving particular yarn strands into operative position, weaving elements operative to engage the selected strands, means for severing the strands when so engaged, means operative to move the elements with engaged yarn sections longitudinally relative to, and into the warp shed in weaving relation therewith, and means for operating the weaving elements to weave respective strands about corresponding warp threads.

65. In a loom of the character described in claim 21, a carrier in which the weaving blocks are transversely movable; means for moving the carrier longitudinally relative to the warp shed for the purpose of moving the weaving blocks and yarn section into the warp shed in weaving relation therewith, and other means for moving the carrier transversely in intermittent progression to move the weaving blocks into operative relation with successive segregated groups of warp threads across the loom.

66. In a loom, means for holding the warp threads; warp shedding mechanism; a plurality of separate groups of fingers spaced at intervals side by side across the loom, each finger being formed to support and guide a plurality of yarn strands; lay mechanism; weaving mechanism including yarn grippers and a weaving block in operative relation to each finger group to weave a section of fabric across the loom; means for moving the yarn fingers to align the end of a selected yarn strand in each group, with the grippers; means for selecting such strands; a gripper carrier; a support in which the carrier is slidable longitudinally relative to the fingers and the weaving blocks; means for operating the grippers; means for reciprocating the carrier to engage the grippers with the ends of the selected yarn strands in the fingers, and to draw them into engagement with the respective weaving blocks; means for coiling the strands about respective segregated groups of warp threads; to form oriental knots, the severed strands being held near the respective ends by the grippers and weaving blocks and the knot drawn tight before releasing the ends; a carrier member with which the weaving blocks are slidably engaged; a support therefor; a member slidably supported by the carrier and adapted to engage the weaving blocks; means for operating the said member to reciprocate the weaving blocks in coordination with warp shedding mechanism to coil the yarn strands about respective segregated groups of warp threads to form a spaced series of oriental knots across the loom, such means including a cam element adapted to engage the slidably supported member; and means for operating the cam element; and means for completing a transverse row of knots in intermittent progression, across the loom.

67. In a loom, means for holding the warp threads; warp shedding mechanism; a plurality of fingers arranged in a plurality of groups spaced at intervals side by side, above and in advance of the fell, and transversely across the loom; each finger being formed to guide a plurality of yarn strands; weaving mechanism including a plurality of weaving blocks equal in number and respectively in operative relation to the finger groups; means for controlling the fingers to supply a single strand of yarn from each group to engage the respective weaving block; means movable to engage the presented yarn strands and draw each to engage the respective weaving blocks; means for severing the strands when so drawn from their supply to provide independent sections of yarn; means for moving the weaving blocks and yarn sections into the warp shed in weaving relation therewith; means for withdrawing the yarn fingers from the path of the weaving elements; and means for reciprocating the weaving blocks in unison, to weave transversely of the warp threads, to form a series of independent knots thereabout; and means for completing the weaving, in intermittent progression to form a complete row of independent knots about respective segregated groups of warp threads across the loom.

68. In a loom, means for holding the warp threads; warp shedding mechanism; a plurality of fingers arranged in a plurality of groups spaced at intervals side by side, above and in advance of the fell, and transversely across the loom; each finger being formed to guide a plurality of yarn strands; weaving mechanism including a plurality of weaving blocks equal in number and respectively in operative relation to the finger groups; means for controlling the fingers to supply a single strand of yarn from each group to engage the respective weaving block; means movable to engage the presented yarn strands and draw each to engage the respective weaving blocks; means for severing the strands when so drawn from their supply to provide independent sections of yarn; a gripper carrier; a weaving block carrier; means for reciprocating the gripper carrier and the weaving block carrier to transfer the yarn sections into the warp shed in weaving relation to respective segregated groups of warp threads and without releasing the ends of the yarn strands; and means for reciprocating the weaving blocks in unison, to weave transversely of the warp threads, to form a series of independent knots thereabout; and means for completing the weaving, in intermittent progression to form a complete row of independent knots about respective segregated groups of warp threads across the loom.

69. In a loom, means for holding the warp threads; warp shedding mechanism; a plurality of fingers arranged in a plurality of groups spaced at intervals side by side, above and in advance of the fell, and transversely across the loom; each finger being formed to guide a plurality of yarn strands; weaving mechanism including a plurality of weaving blocks equal in number and respectively in operative relation to the finger groups; means for controlling the fingers to supply a single strand of yarn from each group to engage the respective weaving block; means movable to engage the presented yarn strands and draw each to engage with the respective weaving hook; means for severing the strands when so drawn from their supply to provide independent sections of yarn; means for moving the weaving blocks and yarn sections into the warp shed in weaving relation therewith; such means including a gripper carrier and a weaving block carrier; a pair of levers in operative engagement with the gripper carrier; means for locking the carriers to be reciprocated together; automatic lock releasing means; comprising a cam element; a shaft to which it is secured; means for rotating the shaft and cam, to release the locking means, to permit gripper carrier to move independent of the weaving block carrier, to permit functioning of the grippers; and means for reciprocating the weaving blocks in unison, to weave transversely of the warp threads, to form a series of independent knots thereabout; and means for completing the weaving, in intermittent progression to form a complete row of independent knots about respective segregated groups of warp threads.

70. In a loom of the character described in claim 69, cam elements rotatable with the lock releasing cam elements, and adapted to engage with and control the opening and closing of the grippers to function in coordination with the knot weaving mechanism.

71. In a loom of the character described in claim 69, a cam shaft; means for rotating the shaft in predetermined relation to the rotation of the main driving shaft of the loom; cam elements secured thereto and respectively functioning to operate the shear blades, the controlling of the grippers, and the controlling of the locking mechanism between the carriers.

72. In a loom of the character described in claim 69, a cam shaft; means for rotating the shaft in predetermined relation to the rotation of the main driving shaft of the loom; cam elements secured thereto and respectively functioning to operate the shear blades, the controlling of the grippers, and the controlling of the locking mechanism between the carriers; and controlling means by which the shaft and cams are rotated to coordinate in operation with the action of the weaving mechanism.

73. In a loom of the character described in claim 69, cam elements rotatable with the lock releasing cam elements, and adapted to engage with and control the opening and closing of the grippers to function in coordination with the knot weaving mechanism; and means for interrupting the rotation of the shaft to coordinate with the laying of binder picks.

74. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom; in combination therewith, groups of independently movable yarn fingers equal in number to the weaving blocks and respectively in operative relation thereto; means for moving the fingers, such means including a lifting member, extending transversely of the loom, and adapted to move in a fixed path; a projection from each finger intersecting the said path of movement; means for moving the member in coordination with the weaving mechanism, to move the fingers in one direction to a common maximum limit; means operatively connected with the pattern mechanism for limiting the return movement of the individual fingers to present a selected strand for each group of fingers to be woven by each complete operation of the weaving blocks; and means for completing the transverse weaving, intermittently and progressively.

75. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom; in combination therewith, groups of independently movable yarn fingers equal in number to the weaving blocks and respectively in operative relation thereto; means for moving the fingers, such means including a lifting member extending transversely of the loom, and adapted to move in a fixed path; a projection from each finger intersecting the said path of movement; means for moving the member in coordination with the weaving mechanism, to move the fingers in one direction to a common maximum limit; movable elements equal in number to the fingers and operatively connected with the pattern mechanism to engage independently the respective fingers, to limit the return movement thereof selectively to present a particular strand from each group of fingers to be woven by each complete operation of the weaving blocks; and means for retaining the movable elements in set position; and means for releasing to permit resetting.

76. In a loom of the character described in claim 23, in combination therewith, pattern mechanism; abutments movable in operative relation to respective fingers, and controlled in operation by the pattern mechanism to engage corresponding fingers to selectively limit the reverse movement of such fingers to supply a particular yarn strand in a finger or group of fingers to the weaving mechanism.

77. In a loom of the character described in claim 23, in combination therewith, pattern mechanism; abutments movable in operative relation to respective fingers, and controlled in operation by the pattern mechanism to engage corresponding fingers to selectively limit the reverse movement of such fingers to supply a particular yarn strand in a finger or group of fingers to the weaving mechanism; and means for retaining all fingers in set position to supply the selected strands simultaneously to the weaving mechanism to weave across the loom.

78. In a loom of the character described in claim 23, and having pattern mechanism including a plurality of series of lifting wires extending transversely of the loom, said lifting wires having hooked ends; a grid, including a lifting knife movable in a fixed path to engage the hooks of each series of lifting wires for pattern weaving, the hooks of each series varying in normal relation to the respective knives to vary the degree of movement of the lifting wires to correspond with the spacing of the several yarn strands in each finger; indicator wires, axially movable transversely of the lifter wires, each provided with an eye for guiding its lifter wire; springs normally holding the indicator wires to yieldingly retain the hooks of the lifting wires normally in the paths of the respective grid knives; a pattern device including perforated pattern cards, movable intermittently, normal to the axes of the indicator wires, and adapted to be oscillated to permit the passage of indicator wires aligned with certain perforations according to the pattern and to depress all other indicator wires to remove the hooks on corresponding lifting wires from respective paths of the grid knives; abutments movable in operative relation to respective fingers, and adapted to engage therewith; connections from each abutment with corresponding lifting wires in each series, whereby the abutment will be lifted by the lifting wire indicated and the return movement of the finger limited to supply a selected yarn strand in a finger or group of fingers to the weaving mechanism, in combination therewith a pressure member perforated to agree with all indicator wires, and movable to engage a card in operative relation thereto, to ocillate it to engage wires not aligned with perforations to depress them and remove the hooks of corresponding lifting wires from the paths of respective grid knives; and means for moving the pressure member for this purpose, in coordination with the weaving mechanism.

79. In a loom of the character described in claim 23, and having pattern mechanism including a plurality of series of lifting wires extending transversely of the loom, said lifting wires having hooked ends; a grid, including a lifting knife movable in a fixed path to engage the hooks of each series of lifting wires for pattern weaving, the hooks of each series varying in normal relation to the respective knives to vary the degree of movement of the lifting wires to correspond with the spacing of the several yarn strands in each finger; indicator wires, axially movable transversely of the lifter wires, each provided with an eye for guiding its lifter wire; springs normally holding the indicator wires to yieldingly retain the hooks of the lifting wires normally in the paths of the respective grid knives; a pattern device including perforated pattern cards, movable intermittently, normal to the axes of the indicator wires, and adapted to be oscillated to permit the passage of indicator wires aligned with certain perforations according to the pattern and to depress all other indicator wires to remove the hooks on corresponding lifting wires from respective paths of the grid knives; abutments movable in operative relation to respective fingers, and adapted to engage therewith; connections from each abutment with corresponding lifting wires in each series, whereby the abutment will be lifted by the lifting wire indicated and the return movement of the finger limited to supply a selected yarn strand in a finger or group of fingers to the weaving mechanism, in combination therewith, a pressure member perforated to agree with all indicator wires and adapted to be swung in operative relation to the indicator wires to engage a pattern card with such wires as are not aligned with perforations therein, to depress them and remove hooks on corresponding lifting wires from the paths of the grid knives, and to permit indicator wires aligned with perforations in the card to pass therethrough, and the hooks on corresponding lifting wires to be engaged by respective grid knives and lifted and selected yarn strands be supplied to the weaving mechanism; and means coordinated with the weaving mechanism for operating the pressure member.

80. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom, in combination therewith, groups of independently movable yarn fingers, equal in number to the weaving blocks and respectively in operative relation thereto; means for moving the fingers; means operatively connected with the pattern mechanism for selecting a particular strand from each group of fingers to be woven by each complete operation of the weaving blocks; and means for completing the transverse weaving, intermittently and progressively; and means coordinated with the weaving mechanism for changing the order of selection between each weaving operation.

81. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom, in combination therewith, groups of independently movable yarn fingers equal in number to the weaving blocks and respectively in operative relation thereto; means for moving the fingers; means operatively connected with the pattern mechanism for selecting a particular strand from each group of fingers to be woven by each complete operation of the weaving blocks; and means for completing the transverse weaving, intermittently and progressively; and means coordinated with the weaving mechanism for changing the order of selection between each weaving operation; and means for interrupting the operation of the pattern mechanism to permit binder shedding after each transverse line of weaving is completed.

82. In a loom of the character described in claim 23, and having pattern mechanism including a plurality of series of lifting wires extending transversely of the loom, said lifting wires having hooked ends; a grid, including a lifting knife movable in a fixed path to engage the hooks of each series of lifting wires for pattern weaving, the hooks of each series varying in normal relation to the respective knives to vary the degree of movement of the lifting wires to correspond with the spacing of the several yarn strands in each finger; indicator wires; axially movable transversely of the lifter wires, each provided with an eye for guiding its lifter wire; springs normally holding the indicator wires to yieldingly retain the hooks of the lifting wires normally in the paths of the respective grid knives; a pattern device including perforated pattern cards, movable intermittently, normal to the axes of the indicator wires, and adapted to be oscillated to permit the passage of indicator wires aligned with certain perforations according to the pattern and to depress all other indicator wires to remove the hooks on corresponding lifting wires from respective paths of the grid knives; abutments movable in operative relation to respective fingers, and adapted to engage therewith; connections from each abutment with corresponding lifting wires in each series, whereby the abutment will be lifted by the lifting wire indicated and the return movement of the finger limited to supply a selected yarn strand in a finger or group of fingers to the weaving mechanism, in combination therewith, a pressure member perforated to agree with all indicator wires, and movable to engage a card in operative relation thereto, to oscillate it to engage wires not aligned with perforations to depress them and remove the hooks of corresponding lifting wires from the paths of respective grid knives and means for moving the pressure member for this purpose.

83. In a loom having means for holding the warp threads; warp shedding mechanism; pattern mechanism; and weaving means including a plurality of weaving blocks spaced at intervals across the loom and adapted to be operated to weave sections of fabric transversely of said warp threads across the loom, in combination therewith, groups of independently movable yarn fingers equal in number to the weaving blocks and respectively in operative relation thereto; means for moving the fingers; means operatively connected with the pattern mechanism for selecting a particular strand from each group of fingers to be woven by each complete operation of the weaving blocks; and means for completing the transverse weaving, intermittently and progressively; and means coordinated with the weaving mechanism for changing the order of selection between each weaving operation; and means for operating the pattern mechanism to cooperate with the operation of the weaving mechanism.

THOMAS P. WALSH.